(12) United States Patent (10) Patent No.: US 11,780,026 B2
Sugihashi et al. (45) Date of Patent: Oct. 10, 2023

(54) WELDING OPERATION MONITORING SYSTEM AND WELDING OPERATION MONITORING METHOD

(71) Applicant: NIPPON STEEL CORPORATION, Tokyo (JP)

(72) Inventors: Atsushi Sugihashi, Tokyo (JP); Kotaro Watanabe, Tokyo (JP); Yoshihiro Hashimoto, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 685 days.

(21) Appl. No.: 16/758,352

(22) PCT Filed: Jan. 22, 2018

(86) PCT No.: PCT/JP2018/001749
§ 371 (c)(1),
(2) Date: Apr. 22, 2020

(87) PCT Pub. No.: WO2019/142350
PCT Pub. Date: Jul. 25, 2019

(65) Prior Publication Data
US 2020/0246906 A1 Aug. 6, 2020

(51) Int. Cl.
*G06T 7/00* (2017.01)
*B23K 11/087* (2006.01)
(Continued)

(52) U.S. Cl.
CPC ...... *B23K 11/0873* (2013.01); *B23K 11/0006* (2013.01); *B23K 31/027* (2013.01); (Continued)

(58) Field of Classification Search
CPC ............ B23K 11/0873; B23K 11/0006; B23K 31/027; B23K 31/125; B23K 2101/06; (Continued)

(56) References Cited

U.S. PATENT DOCUMENTS 3,976,382 A * 8/1976 Westby ................ B23K 9/0956
356/237.1
5,607,605 A * 3/1997 Musasa ................ B23K 26/032
219/121.64
(Continued)

FOREIGN PATENT DOCUMENTS

CN 101358836 A 2/2009
CN 104245216 A 12/2014
(Continued)

OTHER PUBLICATIONS

International Search Report for PCT/JP2018/001749 (PCT/ISA/210) dated Apr. 24, 2018.
(Continued)

*Primary Examiner* — Aaron W Carter
(74) *Attorney, Agent, or Firm* — Birch, Stewart, Kolasch & Birch, LLP

(57) ABSTRACT

The welding operation monitoring system includes an image capturing device that is disposed on a side opposite to a side to which the plasma flow is supplied out of a pipe inside and a pipe outside of the strip-shaped steel sheet formed in a tubular shape, and is configured to capture a color image including a plasma flow over the V-shaped region; and a welding operation monitoring device that is configured to generate a specific color component image obtained by extracting a specific color component from the color image, and specifies a V-shaped display region, which is a region corresponding to the V-shaped region within the color image, on the basis of the V-shaped region shown in the specific color component image, thereby analyzing a state of the welding operation.

20 Claims, 22 Drawing Sheets

(51) Int. Cl.
*G06T 7/90* (2017.01)
*B23K 11/00* (2006.01)
*B23K 31/02* (2006.01)
*B23K 31/12* (2006.01)
*B23K 101/06* (2006.01)

(52) U.S. Cl.
CPC .......... *B23K 31/125* (2013.01); *G06T 7/0004* (2013.01); *G06T 7/90* (2017.01); *B23K 2101/06* (2018.08); *G06T 2207/30136* (2013.01)

(58) Field of Classification Search
CPC .... B23K 11/25; B23K 11/252; B23K 13/025; B23K 2035/408; G06T 7/0004; G06T 7/90; G06T 2207/30136; G06T 2207/30152; B21C 37/08; B21C 51/00
See application file for complete search history.

(56) References Cited

U.S. PATENT DOCUMENTS

| | | | | |
|---|---|---|---|---|
| 5,961,859 | A * | 10/1999 | Chou | B23K 26/032 219/121.64 |
| 2010/0133247 | A1 | 6/2010 | Mazumder | B23K 26/244 219/137 R |
| 2010/0232678 | A1 * | 9/2010 | Hasegawa | B23K 11/0873 382/141 |
| 2012/0325805 | A1 | 12/2012 | Hasegawa et al. | |
| 2014/0326705 | A1 * | 11/2014 | Kodama | G06T 7/269 219/121.83 |
| 2015/0076117 | A1 * | 3/2015 | Neugebauer | B23K 13/046 219/61.5 |
| 2015/0090697 | A1 | 4/2015 | Hasegawa et al. | |
| 2015/0134292 | A1 * | 5/2015 | Ignatowski | G01J 5/05 348/90 |
| 2016/0203596 | A1 * | 7/2016 | Kodama | G06T 7/0008 382/152 |
| 2016/0350902 | A1 * | 12/2016 | Hasegawa | B21C 37/08 |
| 2017/0182605 | A1 * | 6/2017 | Rajagopalan | B23K 9/32 |
| 2018/0031152 | A1 * | 2/2018 | Rajagopalan | B23K 9/0282 |
| 2019/0201957 | A1 * | 7/2019 | Hasegawa | B23K 31/003 |
| 2020/0038929 | A1 * | 2/2020 | Hasegawa | B23K 37/0538 |
| 2020/0246906 | A1 * | 8/2020 | Sugihashi | B23K 31/125 |
| 2020/0391318 | A1 * | 12/2020 | Watanabe | B21C 37/0818 |

FOREIGN PATENT DOCUMENTS

| | | |
|---|---|---|
| JP | 56-50579 U | 5/1981 |
| JP | 5-261564 A | 10/1993 |
| JP | 5079929 B2 | 11/2012 |
| JP | 2015-217420 A | 12/2015 |
| JP | 5880794 B1 | 3/2016 |

OTHER PUBLICATIONS

Written Opinion of the International Searching Authority for PCT/JP2018/001749 (PCT/ISA/237) dated Apr. 24, 2018.

* cited by examiner (A)

ER (B)

(A)

(B)

(C)

(A)

(B)

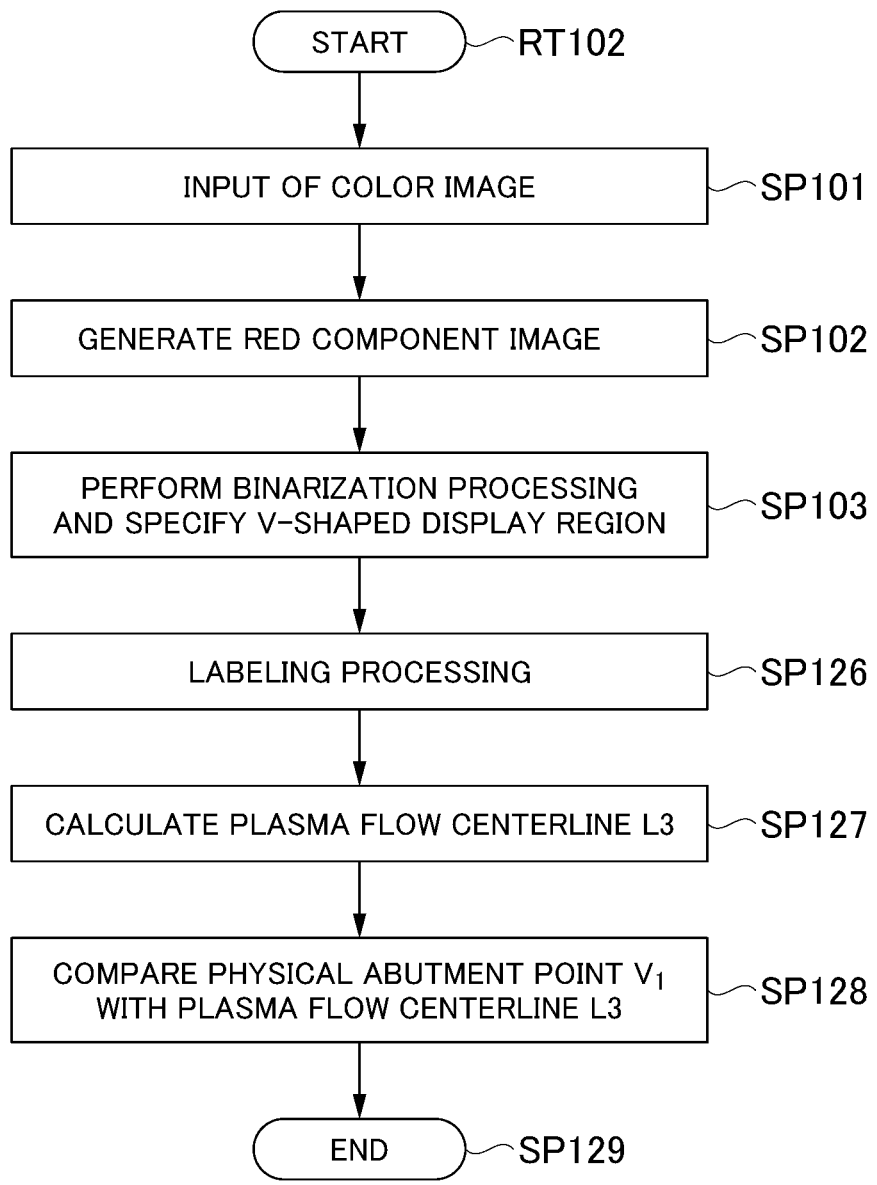

WELDING OPERATION MONITORING SYSTEM AND WELDING OPERATION MONITORING METHOD

TECHNICAL FIELD OF THE INVENTION

The present invention relates to a welding operation monitoring system and a welding operation monitoring method.

RELATED ART

In the electric resistance welding of manufacturing an electric resistance welded steel pipe, a strip-shaped steel sheet is continuously formed in a tubular shape while being conveyed. Also, both abutment end portions of a strip-shaped steel sheet are heated and melted with a high-frequency current while being converged in a V-shape, and both the abutment end portions are welded while being pressed by a squeeze roll. In such related-art electric resistance welding, a welded part is exposed to the ambient air when the electric resistance welding is performed. Thus, Oxides are generated on the surface of the welded part. Although the oxides are usually discharged, a penetrator, which may cause welding defects, is generated in a case where the oxides remain on the surface of the welded part.

Recently, the technique of supplying a plasma flow to the welded part in order to reduce the oxides generated on the surface of the welded part during the electric resistance welding is disclosed. Hereinafter, the technique of performing the electric resistance welding while supplying the plasma flow to the welded part is referred to as plasma shield electric resistance welding. In addition, the technical concept of the plasma shield electric resistance welding is basically different from that of the plasma welding of performing welding with plasma itself.

In the plasma shield electric resistance welding, in the process of supplying the plasma flow to a suitable position of the welded part, thereby heating and melting abutment end portions of the strip-shaped steel sheet (hereinafter may be referred to as a steel sheet), the surrounding atmosphere of the abutment end portions can be maintained in a state where oxygen concentration is low due to a shielding action of the abutment end portions caused by the ionized plasma gas, a reduction action caused by the ionized plasma gas, or the like. As a result, an oxide film of the abutment end portions, which may be the oxides defects after welding, can be suppressed in the process of generation thereof, and high-quality welding with few defects is allowed.

In the field of such plasma shield electric resistance welding of supplying the plasma flow to the welded part of such a steel sheet to perform the electric resistance welding, a welding state monitoring system, which monitors the welding state of a welded part, is known (for example, refer to Patent Document 1). In the welding state monitoring system, a plasma flow supply device, which supplies a plasma flow to the welded part, and an image capturing device, which images the welded part, are disposed above a steel sheet formed in a tubular shape. Also, the welded part to which the plasma flow is supplied from above the steel sheet is imaged by the image capturing device via a filter, similarly, from above the steel sheet, and the state of the welded part is analyzed by performing predetermined image processing on the obtained image.

PRIOR ART DOCUMENT

Patent Document

[Patent Document 1] Japanese Patent No. 5880794

DISCLOSURE OF THE INVENTION

Problems to be Solved by the Invention

However, in such a related-art monitoring system, the plasma flow is supplied toward the welded part from the position above the steel sheet where the image capturing device is disposed. Therefore, the plasma flow may overlap the welded part. Thus, when the welded part is analyzed on the basis of the captured image, there was a problem that it is difficult to analyze the welded part because the influence of the plasma flow is great. Additionally, in the related-art monitoring system, not only the image capturing device but also the plasma flow supply device are disposed above the steel sheet. Therefore, there was also a problem that the wide installation space for disposing both the image capturing device and the plasma flow supply device above the steel sheet is required.

The present invention has been made in view of the problems as described above, and an object thereof is to provide a welding operation monitoring system and a welding operation monitoring method capable of reducing the influence of a plasma flow supplied for shielding compared to the related art to analyze the state of a welding operation while reducing a demand for the equipment installation space around a steel sheet.

Means for Solving the Problems

The invention adopts the following measures in order to solve the above problems to achieve the relevant object.

(1) One aspect of the invention is a welding operation monitoring system that is configured to monitor a welding operation when a pair of abutment end portions is converged in a V-shape while a strip-shaped steel sheet is formed in a tubular shape and electric resistance welding is performed while supplying a plasma flow to a welded part including a V-shaped region to perform shielding. The welding operation monitoring system includes an image capturing device that is disposed on a side opposite to a side to which the plasma flow is supplied out of a pipe inside and a pipe outside of the strip-shaped steel sheet formed in a tubular shape, and is configured to capture a color image including the plasma flow over the V-shaped region; and a welding operation monitoring device that is configured to generate a specific color component image obtained by extracting a specific color component from the color image, and specifies a V-shaped display region, which is a region corresponding to the V-shaped region within the color image, on the basis of the V-shaped region shown in the specific color component image, thereby analyzing a state of the welding operation.

(2) In the aspect according to the above (1), the welding operation monitoring device may include a blue component image extraction unit that is configured to generate a blue component image as the specific color component image.

(3) In the case of the above (2), the welding operation monitoring device may further include a plasma flow position analysis unit that is configured to extract a red component image or a green component image or a combination thereof from a portion of the V-shaped display region of the color image, and specifies a plasma flow center region of the plasma flow from shading of the extracted red component image or the green component image or a combination thereof.

(4) In the case of the above (3), the plasma flow position analysis unit may include a plasma flow centerline calculation unit that is configured to linearly approximate a pair of plasma edges forming the plasma flow center region to find a V-shaped convergence angle and finds a bisector between the pair of plasma edges as a plasma flow centerline.

(5) In the case of the above (4), the welding operation monitoring device may further include a physical abutment point analysis unit that is configured to detect a physical abutment point where the pair of abutment end portions physically abuts against each other on the basis of the blue component image.

(6) In the case of the above (5), the plasma flow position analysis unit may further include a comparing unit that is configured to find a relative positional relationship between a position of the plasma flow centerline and a position of the physical abutment point obtained from the physical abutment point analysis unit.

(7) In the case of the above (2) or (3), the welding operation monitoring device may further include a physical abutment point analysis unit that is configured to detect a physical abutment point where the pair of abutment end portions physically abuts against each other on the basis of the blue component image.

(8) In the case according to any one of the above (2) to (7), the welding operation monitoring device may further include a geometrically V-shaped convergence point analysis unit that is configured to find a pair of approximated straight lines obtained by linearly approximating the pair of abutment end portions forming the V-shaped display region and detects an intersection point between the pair of approximated straight lines as a geometrically V-shaped convergence point.

(9) In the case according to any one of the above (2) to (8), the welding operation monitoring device may further include a welding point analysis unit that is configured to eliminate an image of the plasma flow specified on the basis of the blue component image from the color image, thereby generating a plasma flow eliminated image including a welding bead line and a pair of melting edge lines and finding a welding point on the basis of the plasma flow eliminated image.

(10) In the aspect according to the above (1), the following configuration may be adopted: the image capturing device includes an optical element that is configured to selectively reduce a luminance of a component corresponding to a specific wavelength in a red component of the plasma flow; and the welding operation monitoring device includes a red component image extraction unit that is configured to extract a red component image as the specific color component image from the color image captured via the optical element by the image capturing device, and a binarization processing unit that is configured to perform binarization processing on the red component image.

(11) In the case of the above (10), the welding operation monitoring device may further include a plasma flow position analysis unit that is configured to specify a plasma flow center region of the plasma flow on the basis of the binarized red component image.

(12) In the case of the above (11), the plasma flow position analysis unit may have a plasma flow centerline calculation unit that is configured to find a bisector between a pair of plasma edges as a plasma flow centerline on the basis of a V-shaped convergence angle obtained by linearly approximating the pair of plasma edges forming the plasma flow center region.

(13) In the case of the above (12), the welding operation monitoring device may further include a physical abutment point analysis unit that is configured to detect a physical abutment point where the pair of abutment end portions physically abuts against each other on the basis of the binarized red component image.

(14) In the case of the above (13), the plasma flow position analysis unit may further include a comparing unit that is configured to find a relative positional relationship between a position of the plasma flow centerline and a position of the physical abutment point obtained from the physical abutment point analysis unit.

(15) In the case according to the above (10) or (11), the welding operation monitoring device may further include a physical abutment point analysis unit that is configured to find a physical abutment point where the pair of abutment end portions physically abuts against each other on the basis of the binarized red component image.

(16) In the case according to any one of the above (10) to (15), the welding operation monitoring device may further include a geometrically V-shaped convergence point analysis unit that is configured to find a pair of approximated straight lines obtained by linearly approximating a pair of melting edge lines on the basis of the binarized red component image and finds an intersection point between the pair of approximated straight line as a geometrically V-shaped convergence point.

(17) In the case according to any one of the above (10) to (16), the welding operation monitoring device may further include a welding point analysis unit that is configured to eliminate an image of the plasma flow specified on the basis of the binarized red component image from the color image, thereby generating a plasma flow eliminated image including a welding bead line and a pair of melting edge lines and finding a welding point on the basis of the plasma flow eliminated image.

(18) Additionally, another aspect of the invention is a welding operation monitoring method that monitors a welding operation when a pair of abutment end portions is converged in a V-shape while a strip-shaped steel sheet is formed in a tubular shape and electric resistance welding is performed while supplying a plasma flow to a welded part including a V-shaped region to perform shielding. The welding operation monitoring method includes an image capturing step of capturing a color image including the plasma flow over the V-shaped region, from a side opposite to a side to which the plasma flow is supplied out of a pipe inside and a pipe outside of the strip-shaped steel sheet formed in a tubular shape; and a welding operation monitoring step of extracting a specific color component from the color image to generate a specific color component image, and specifying a V-shaped display region, which is a region corresponding to the V-shaped region within the color image, on the basis of the V-shaped region shown in the specific color component image, thereby analyzing a state of the welding operation.

(19) In the aspect according to the above (18), the following configuration may be adopted: in the welding operation monitoring step, a blue component image is generated as the specific color component image, a red component image or a green component image or a combination thereof is extracted from the color image of the portion of the V-shaped region, and a plasma flow center region of the plasma flow is specified from shading of the extracted red component image or the green component image or a combination thereof.

(20) In the aspect according to the above (18), the following configuration may be adopted: in the image capturing step, the color image is acquired by selectively reducing a luminance of a component corresponding to a specific wavelength in a red component of the plasma flow to perform capturing, and in the welding operation monitoring step, a state of the welding operation is analyzed on the basis of the color image in which a luminance of the component corresponding to the specific wavelength is selectively reduced.

Effects of the Invention

According to the above respective aspects of the invention, it is possible to reduce the influence of the plasma flow supplied for shielding compared to the related art to analyze the state of the welding operation while reducing the demand for the equipment installation space around the steel sheet.

BRIEF DESCRIPTION OF THE DRAWINGS

FIG. 2(A) is a color image when a welded part to which a plasma flow is supplied from above is similarly imaged from above by an image capturing device. Additionally, FIG. 2(B) is a red component image obtained by extracting a red component from the color image of FIG. 2(A).

FIG. 3(A) is a color image obtained by supplying a plasma flow from a rear surface side of a copper sheet jig in which a V-shaped cutout part is formed and imaging the V-shaped cutout part from above. FIG. 3(B) is a red component image obtained by extracting a red component from the color image of FIG. 3(A), and FIG. 3(C) is a blue component image obtained by extracting a blue component from the color image of FIG. 3(A).

FIG. 4(A) is a color image when a welded part to which a plasma flow is supplied from below a copper sheet provided with a V-shaped cutout obtained by imitating a V-shaped butted state of a steel pipe welded part is imaged from above by the image capturing device. FIG. 4(B) is a red component image obtained by extracting a red component from the color image of FIG. 4(A), and FIG. 4(C) is a blue component image obtained by extracting a blue component from the color image of FIG. 4(A).

FIG. 19 is a schematic view showing specifying the plasma flow center region or the like.

FIG. 23 is a flowchart showing a plasma flow position analysis processing procedure using the welding operation monitoring device.

EMBODIMENTS OF THE INVENTION

Hereinafter, respective embodiments of a welding operation monitoring system and a welding operation monitoring method of the invention will be described.

First Embodiment

<Configuration of Welding Operation Monitoring System of Present Embodiment>

Figure 1:
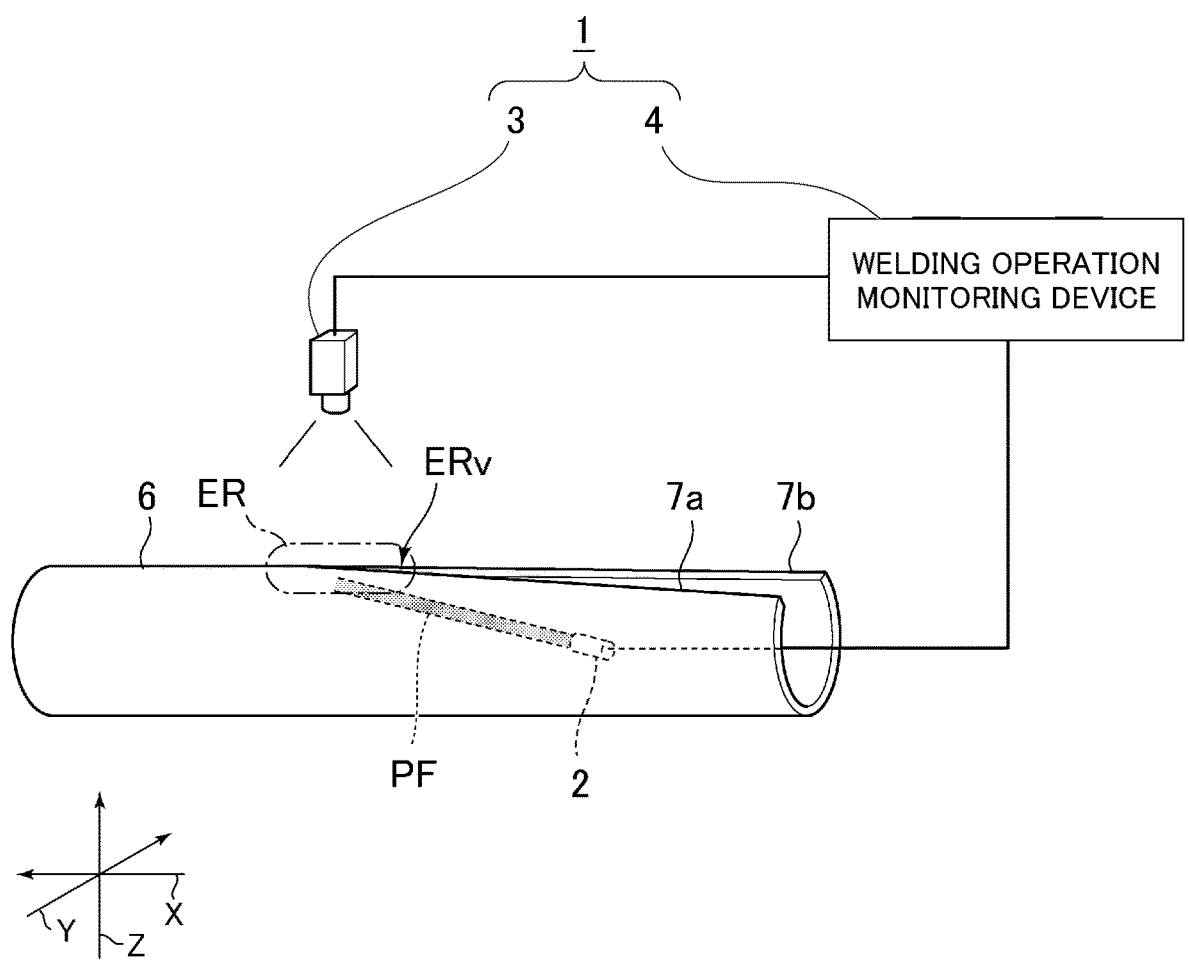
FIG. 1 is a schematic view showing the configuration of a welding operation monitoring system according to a first embodiment of the invention.

FIG. 1 is a schematic view showing the configuration of a welding operation monitoring system 1 of the first embodiment to be used for plasma shield electric resistance welding. In the plasma shield electric resistance welding, while a strip-shaped steel sheet 6 (hereinafter referred to as a "steel sheet 6") toward a conveyance direction X is conveyed, the steel sheet 6 is formed in a tubular shape by a roll group (not shown), induction heating using a work coil (not shown) or direct energization heating using a contact tip (not shown) is performed, and both abutment end portions 7a and 7b of the steel sheet 6 are heated and melted. In that case, a plasma flow for shielding is supplied toward a welded part from the plasma flow supply device 2 installed inside a pipe of the steel sheet 6 formed in a tubular shape.

In addition, in FIG. 1, Z indicates a height direction orthogonal to the conveyance direction X, and Y indicates a direction (butting direction) which is orthogonal to both the conveyance direction X and the height direction Z and in which the abutment end portions 7a and 7b are butted against each other.

The welding operation monitoring system 1 includes an image capturing device 3 that is disposed outside the pipe of the steel sheet 6 opposite to the pipe inside in which the plasma flow supply device 2 is disposed, and a welding operation monitoring device 4 that executes welding operation analysis processing, plasma flow position analysis processing, and the like (to be described below) on an RGB color image captured by the image capturing device 3.

The plasma flow supply device 2 supplies a plasma flow toward the conveyance direction X of the steel sheet 6 from the pipe inside of the steel sheet 6 to a welded part ER in which a V-shaped region ERv where the abutment end portions 7a and 7b of the steel sheet 6 converge in a V-shape is formed (refer to reference sign PF of FIG. 1). The plasma flow supply device 2 covers the welded part ER with the plasma flow by supplying the plasma flow to the welded part ER during the plasma shield electric resistance welding. In the case of the present embodiment, the plasma flow supply device 2 supplies the plasma flow, which is a laminar flow, to the welded part ER, and considerably reduces entrainment of the ambient air to the welded part ER during the plasma shield electric resistance welding. Accordingly, in the welded part ER, generation of oxides on the surface of molten steel can be considerably reduced.

It is desirable that the plasma flow supply device 2 can supply the plasma flow in a range of at least length 100 [mm] or more and more preferably 200 [mm] or more on the steel sheet 6 as viewed along a longitudinal direction of the steel sheet 6 in order to supply the plasma flow to the total range of the welded part ER. In addition, the power consumption of the plasma flow supply device 2 of the present embodiment is about 40 [kW], which is about 1/10 of the power consumption of a plasma welding device dedicated to welding. The plasma flow supply device 2 supplies a plasma flow having Ar and $N_2$ as main components. However, the plasma flow supply device 2 may supply a plasma flow containing $H_2$. In this case, a reducing atmosphere can be formed by the plasma flow around the welded part ER. Accordingly, the oxygen concentration around the welded part ER becomes low, and the formation of the oxides on the surface of the welded part ER can be suppressed.

The image capturing device 3 is disposed above the welded part ER, and the welded part ER can be imaged from above the welded part ER. Additionally, since the image capturing device 3 images the welded part ER to which the plasma flow is supplied from the pipe inside of the steel sheet 6 therefrom, the plasma flow can be viewed over the V-shaped region ERv. Therefore, a region where the plasma flow can be viewed over the V-shaped region ERv can be included in a range where the image capturing device 3 performs image capturing.

The image capturing device 3 is configured to be capable of imaging a color image included a red component, a green component, and the blue component (RGB), and can input the obtained color image to the welding operation monitoring device 4. Specifically, it is desirable to adopt the image capturing device 3 in which an image capturing element capable of detecting visible light (light having a wavelength in a range of 380 [nm] to 780 [nm]) is provided.

In addition, a given amount of plasma flow leaks from the V-shaped region ERv to the pipe outside, and the plasma flow spreads to a wider range than the V-shaped region ERv. However, since such a plasma flow is overwhelmingly smaller in amount than the plasma flow inside the pipe and is hardly reflected on an image obtained captured by the image capturing device 3, the amount can be actually ignored, and the description is omitted in the following description in the present embodiment.

As an example of the image capturing device 3, it is desirable to use a 3CCD type color camera capable of imaging a self-luminance pattern (radiation pattern) from the welded part ER including the V-shaped region ERv. Incidentally, in the present embodiment, for example, the welded part ER including the V-shaped region ERv is imaged from above, using the image capturing device 3 having a pixel number of 1920 pixels×512 pixels, under conditions that the capturing visual field is 190 [mm]×50 [mm], the resolving power is 100 [µm/pixels] or more, the capturing frame rate is 200 [fps], and the exposure time is 1/10000 [sec].

Here, in order to appropriately monitor the welding state of the welded part ER, the image capturing device 3 captures a range including a region where the steel sheet 6 is in a red heat state of the welded parts ER to a welding point W (to be described below) from which molten steel discharge begins from the inside of the steel sheet. In the welding operation monitoring system 1, a geometrically V-shaped convergence point $V_0$, a physical abutment point $V_1$, and the welding point W are detected on the basis of the image of the welded part ER captured by the image capturing device 3 in the welding operation monitoring device 4 to be described below. Therefore, the image capturing device 3 captures the welded part ER so that or the welding operation monitoring device 4 can acquire an image having sufficient resolving power for determining the geometrically V-shaped convergence point $V_0$, the physical abutment point $V_1$, and the welding point W.

Here, the position where the abutment end portions 7a and 7b of the steel sheet 6 are butted against each other deviates in an upstream direction (the right side of the paper surface in FIG. 1) or the downstream direction (the left side of the paper surface in FIG. 1) in the conveyance direction X depending on the heat input conditions of pipe diameter, thickness, or heat input. Therefore, it is desirable that the image capturing device 3 secures an image viewing field of 100 [mm] or more in the conveyance direction X of the steel sheet 6. In this case, it is desirable to have a resolving power of 60 [m] or less. In addition, the resolving power of 60 [µm] or less means having resolving power finer than 60 [µm] (having higher resolving-power characteristics). In the image capturing device 3, when the range having a width of 130 [mm] or more in a Y direction is captured, it is more desirable to have a resolving power of 60 [µm] or less, and even when a range having a width 150 [mm] or more is captured, it is desirable to have a resolving power of 60 [μm] or less.

In order to analyze the welding state by the image processing, it is desirable to vividly capture not only the abutment end portions 7a and 7b of the welded part ER but also welding bead parts around the abutment end portions 7a and 7b with the image capturing device 3. The welding bead parts referred to herein means a rising portion formed as the melted steel has flowed out to the inner and outer surfaces of the steel sheet 6 formed in a tubular shape when both the abutment end portions 7a and 7b are butted against each other. When the welding bead parts are captured with the image capturing device 3, it is preferable that the depth of field is equal to or more than ±4 [mm]. In a case where the image capturing device 3 is installed at a position of about 3000 [mm] above of the welded part ER, in order to satisfy the above capturing conditions, it is desirable to set the aperture value of the image capturing device 3 to F8 to F11. It is preferable that the image capturing device 3 adopts the progressive scanning method. The progressive scanning method is an image scanning method of sequentially scanning an image captured at the same timing and is suitable for capturing a moving image.

If the color image obtained by the image capturing device 3 is input from the image capturing device 3, the welding operation monitoring device 4 can detect the geometrically V-shaped convergence point $V_0$ in the welded part ER, the physical abutment point $V_1$, and the welding point W (to be described below) by executing the welding operation analysis processing (to be described below) on the color image. Additionally, If the color image obtained by the image capturing device 3 is input from the image capturing device 3, the welding operation monitoring device 4 can detect the positional deviation of the plasma flow supplied to the welded part ER by executing the plasma flow position analysis processing (to be described below) on the color image. That is, originally, it is preferable that the physical abutment point $V_1$ is present on the centerline of the plasma flow as viewed in a plan view. However, in practice, there is a case where the centerline of the plasma flow deviates from the position of the physical abutment point $V_1$. According to the welding operation monitoring device 4, this positional deviation can be detected.

<Overview of Welding Operation Monitoring System 1 According to Present Embodiment>

Figure 2:
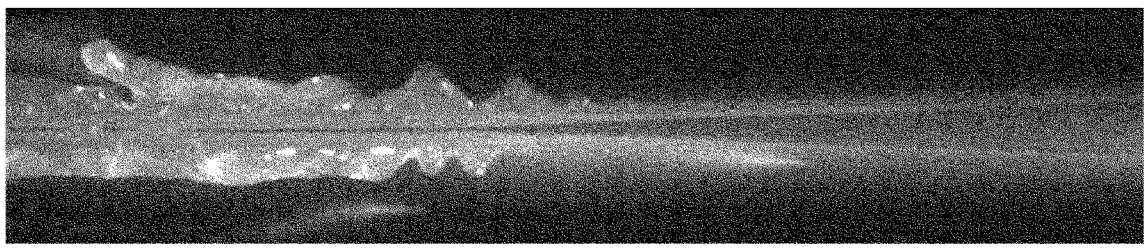
FIG. 2 is a view showing an image acquired by a related-art welding operation monitoring system.
Figure 2:
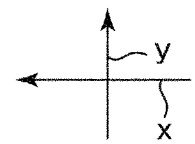
Figure 2:
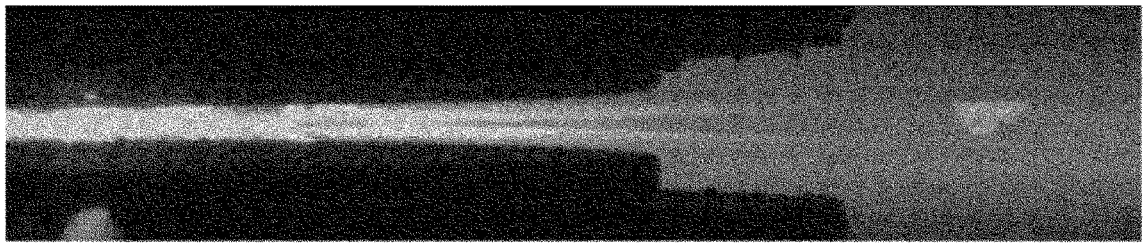

Here, the overview of the welding operation monitoring system 1 according to the present embodiment will be simply described. FIG. 2(A) shows a color image obtained by imaging a state where an image capturing device and a plasma flow supply device are disposed above the steel sheet 6 and a plasma flow is supplied to the welded part ER from thereabove by the image capturing device, in a related-art monitoring system (not shown).

Additionally, FIG. 2(B) shows a red component image obtained by extracting a red component from the color image shown in FIG. 2(A). As shown in FIGS. 2(A) and 2(B), in the image obtained with the related-art monitoring system, it can be confirmed that, since a plasma flow is overlapped on a welded part, a sufficient contrast for detecting abutment end portions of a V-shaped region is hardly obtained due to the influence of self-luminance of the plasma flow or the like having high-luminance. Particularly, in the red component image shown in FIG. 2(B) it can be confirmed that a sufficient contrast for detecting the abutment end portions of the V-shaped region is much more hardly obtained due to the influence of the plasma flow.

Figure 3:
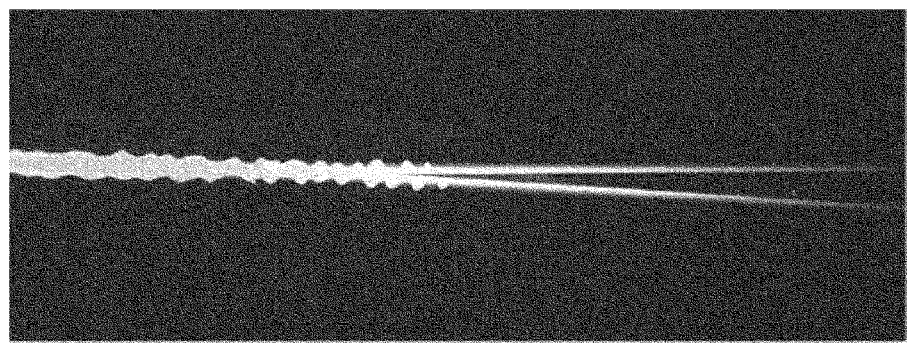
FIG. 3 is a view showing an image acquired by the welding operation monitoring system of the first embodiment of the invention.
Figure 3:
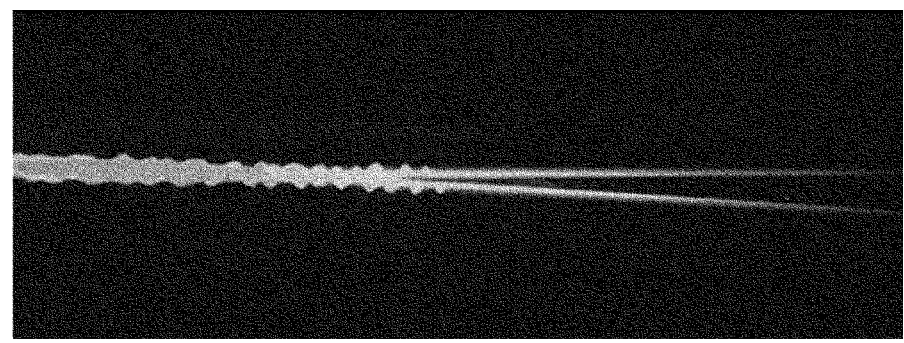
Figure 3:
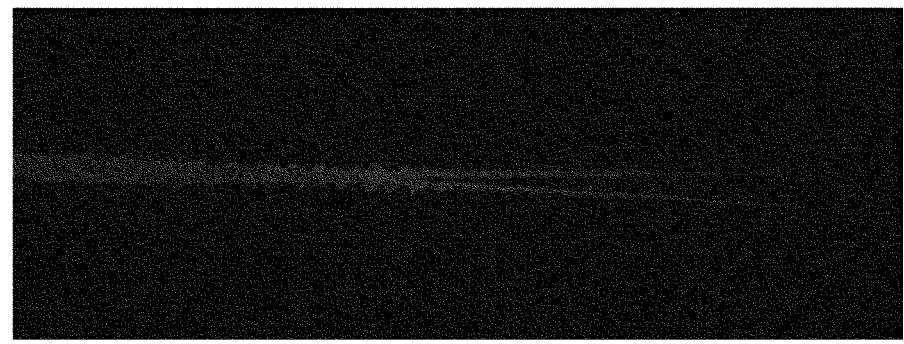

Next, the image of the welded part obtained by the welding operation monitoring system 1 of the present embodiment will be described. FIG. 3(A) shows a color image when no plasma flow is supplied to the welded part and when the welded part is imaged by the image capturing device 3 provided above this welded part. FIG. 3(B) is a red component image obtained by extracting only a red component from the color image of FIG. 3(A), and FIG. 3(C) is a blue component image obtained by extracting a blue component from the color image of FIG. 3(A). As can be seen from the comparison between FIG. 3(B) and FIG. 3(C), it could be confirmed that, on the surface of the steel sheet 6 in the welded part, the luminance of the blue component is markedly lower than the luminance of the red component.

Next, a color image as shown in FIG. 4(A) was obtained using the welding operation monitoring system 1 of the present embodiment by supplying the plasma flow to the vicinity of the peak of the V-shaped cutout part with the plasma flow supply device 2 from a rear surface side of a copper sheet jig in which a V-shaped cutout part is created in imitation of the V-shape butting of the steel sheet 6 and by imaging the V-shaped cutout part from above with the image capturing device 3 provided above the V-shaped cutout part.

The angle of the V-shaped cutout part of the copper sheet jig is created in conformity with the V-shaped butting angle of the steel sheet 6 that is experimentally measured, and the vicinity of the peak of the V-shaped cutout part of the copper sheet jig is equivalent to an actual welded part ER. An image obtained in an experiment is obtained by imitating an image obtained when a situation in which the plasma flow is sprayed from the inside of the steel pipe to the vicinity of the welded part is imaged by the image capturing device 3 from above the welded part ER, during actual steel pipe welding.

As shown in FIG. 4(A), in a case where the plasma flow was supplied to the welded part ER from therebelow and the welded part ER is imaged from above the welded part ER, it could be confirmed that the V-shaped region ERv can be specified by the plasma flow that is visible over the V-shaped region ERv formed in the welded part ER.

Figure 4:
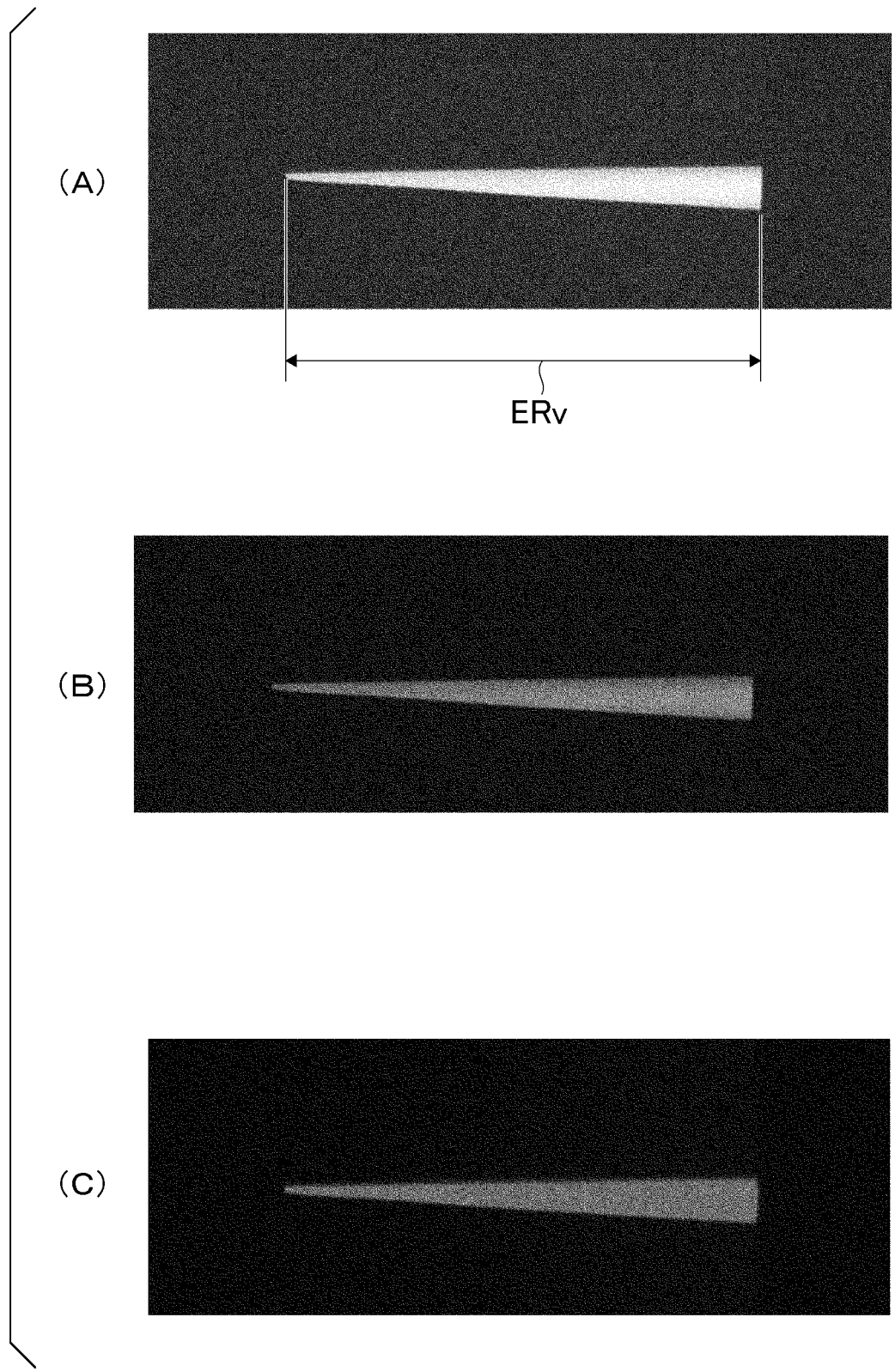
FIG. 4 is a view showing an image acquired by the welding operation monitoring system of the embodiment.

Next, when only the red component was extracted from the color image of FIG. 4(A), the red component image as shown in FIG. 4(B) was obtained. Additionally, when only the blue component was extracted from the color image of FIG. 4(A), the blue component image as shown in FIG. 4(C) was obtained. As shown in FIG. 4(C), in the blue component image, it could be confirmed that the luminance of the blue component in the plasma flow, which is visible over the V-shaped region ERv, is higher than the luminance of the red component of FIG. 4(B). In a case where the blue component image of FIG. 3(C) obtained by extracting only the blue component in the welded part ER when no plasma flow is supplied is compared with the blue component image of FIG. 4 obtained by extracting only the blue component in the plasma that is visible over the V-shaped region ERv, it could be confirmed that the luminance (the luminance of the light, which forms a triangular shape in FIG. 4(C)) of the blue component of the plasma flow that is visible over the V-shaped region ERv, is about twice or more higher than the luminance (the luminance of the light that forms the V-shape in FIG. 3(C)) of the blue component on the surface of the welded part ER when no plasma flow is supplied.

Thus, in the welding operation monitoring system 1 according to the present embodiment, the fact that the luminance of the blue component of the plasma flow, which is visible over the V-shaped region ERv, is about 2 times higher than the luminance of the blue component on the surface of the steel sheet 6 of the welded part ER is utilized. That is, the region of the plasma flow, which is visible over the V-shaped region ERv, is specified by extracting only the blue component with high luminance from the color image obtained by imaging the welded part ER from above the welded part ER during the plasma shield electric resistance welding. Since the shape of the plasma flow specified in this way is also the shape of the V-shaped region ERv as it is, the V-shaped region ERv is specified as a result. Accordingly, in the welding operation monitoring system 1, the geometrically V-shaped convergence point $V_0$, the physical abutment point $V_1$, and the welding point W in the welded part ER are detected, respectively, utilizing the specified V-shaped region ERv. Moreover, the state of the welding operation can be analyzed by specifying the plasma flow center region within the V-shaped region ERv.

<Welding State in Welded Part>

First, at the beginning, the general welding state of the welded part ER in which the plasma shield electric resistance welding is performed will be described, and the geometrically V-shaped convergence point $V_0$, the physical abutment point $V_1$, and the welding point W detected by the welding operation monitoring device 4 will also be described. FIG. 5(A) is a schematic view showing a first type of state among the welding states of the welded part ER. FIG. 5(B) is a schematic view showing a second type of state among the welding states of the welded part ER. FIG. 6(A) is a schematic view showing a state that is in a transition region among the welding states of the welded part ER. FIG. 6(B) is a schematic view showing a state of a second' type among the welding states of the welded part ER. FIG. 7 is a schematic view showing an excessive heat input state among the welding states of the welded part ER.

Figure 5:
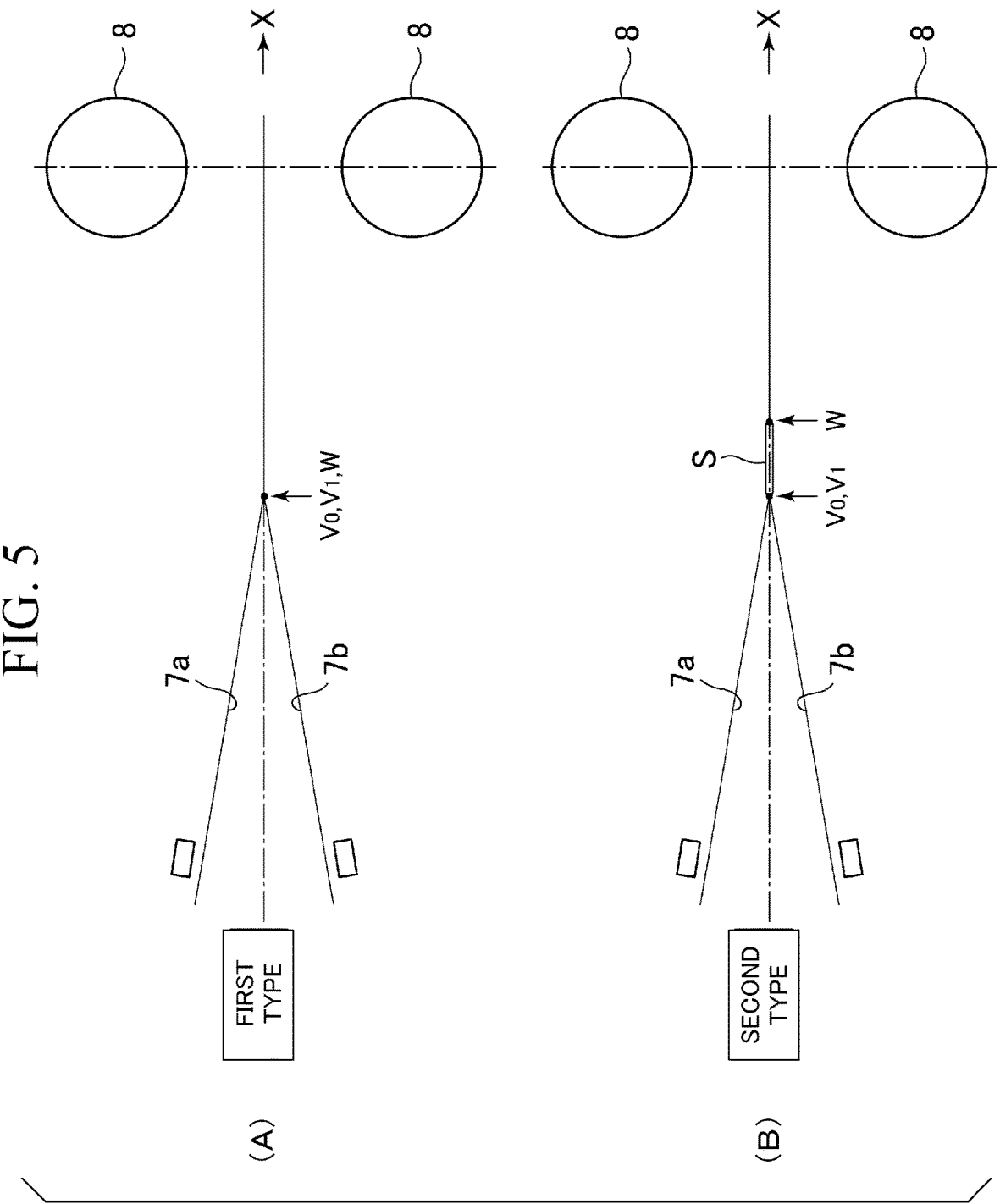
FIG. 5(A) is a schematic view showing a first type of welding state in plasma shield electric resistance welding.
FIG. 5(B) is a schematic view showing a second type of welding state in the plasma shield electric resistance welding.
Figure 6:
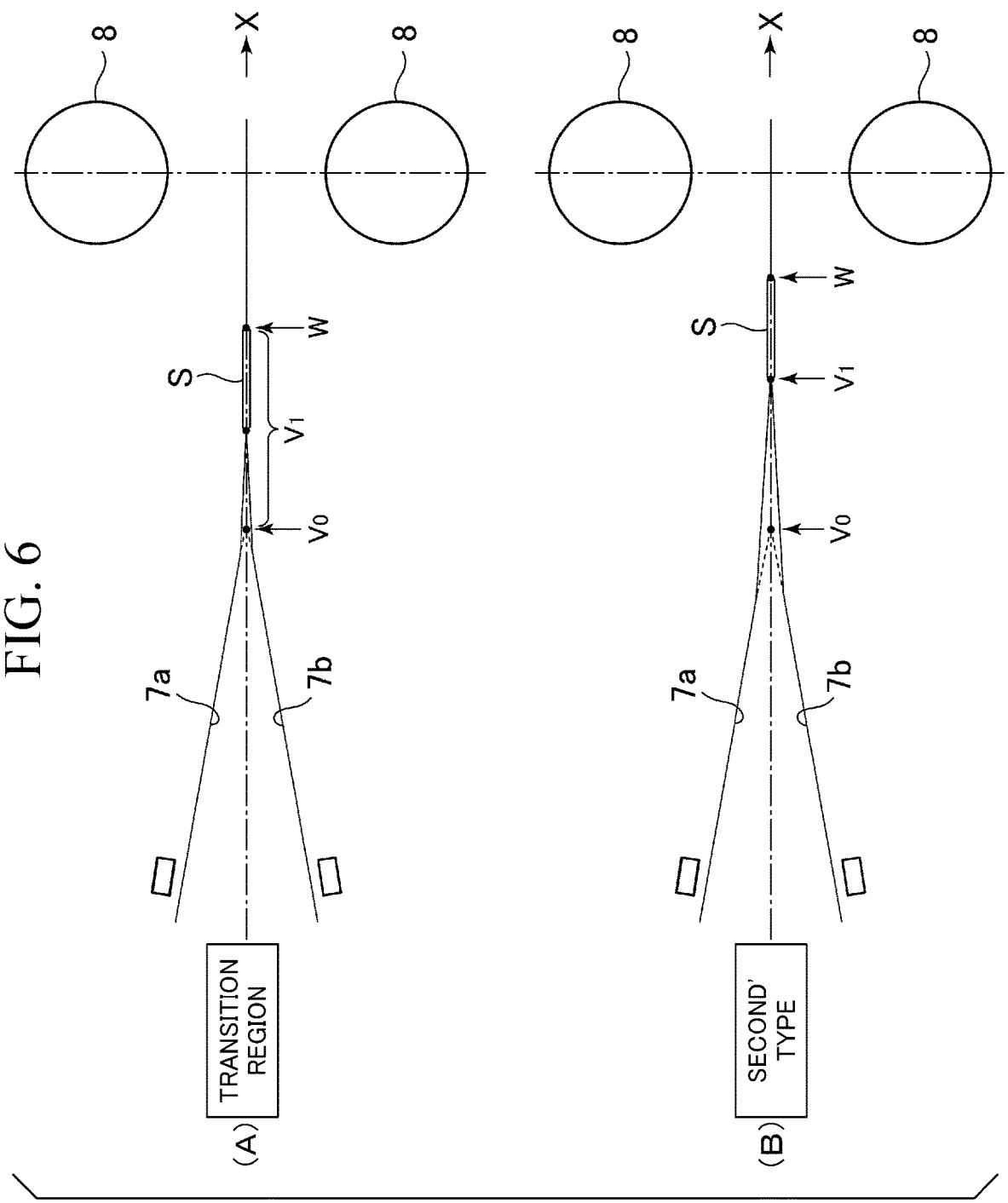
FIG. 6(A) is a schematic view showing a welding state of a transition region in the plasma shield electric resistance welding.
FIG. 6(B) is a schematic view showing a second' type of welding state in the plasma shield electric resistance welding.
Figure 7:
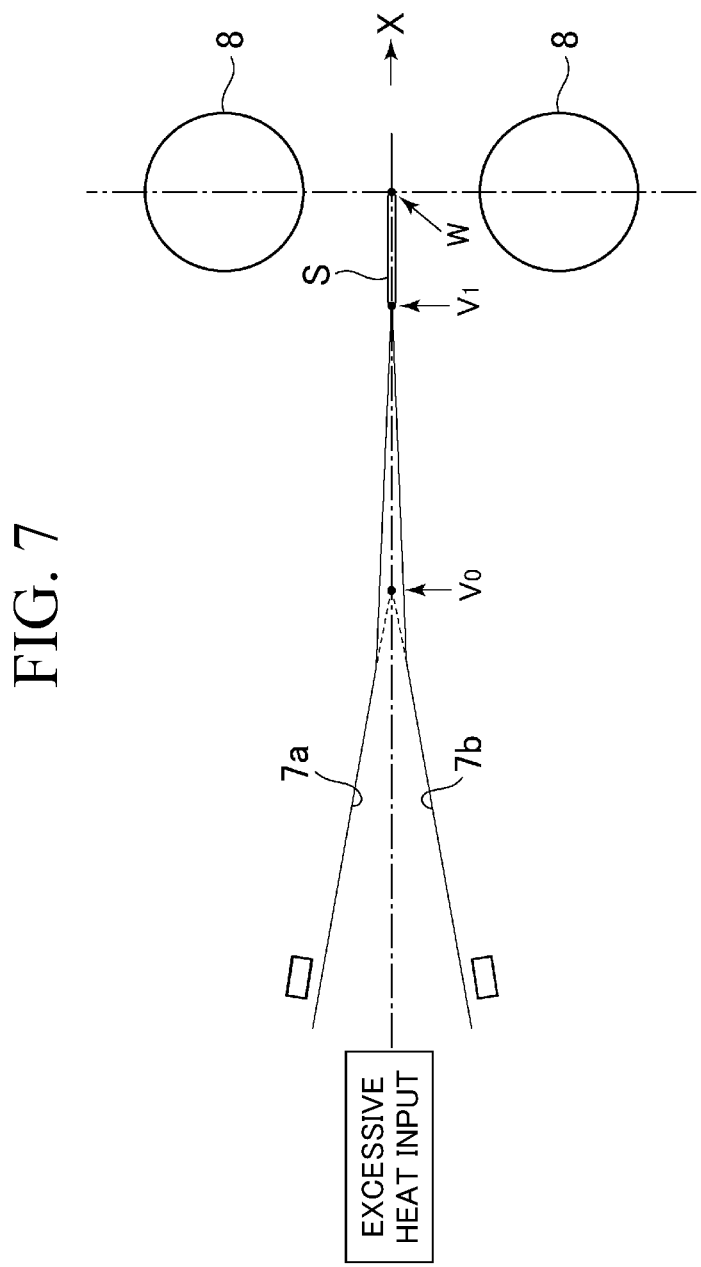
FIG. 7 is a schematic view showing a welding state of excessive heat input in the plasma shield electric resistance welding.

The welding states of the welded part ER are classified into five types of FIG. 5(A), FIG. 5(B), FIG. 6(A), FIG. 6(B), and FIG. 7 depending on differences in the amount of heat input, and the amount of heat (the amount of heat input) applied to the welded part ER increases as the process proceeds from FIG. 5(A) to FIG. 7. The first type shown in FIG. 5(A) is welding under heat input conditions that the geometrically V-shaped convergence point $V_0$, the physical abutment point $V_1$, and the welding point W all match, and the amount of heat input is close to a lower limit of the amount of heat input required for welding. The second type shown in FIG. 5(B) shows a welding state when the amount of heat input is the amount of heat input that is suitable for performing welding. The transition region shown in FIG. 6(A) shows a welding state when the amount of heat input is increased from that of the second type, and the second' type shown in FIG. 6(B) shows a welding state when the amount of heat input is further increased from that in the state of being in the transition region. The excessive heat input shown in FIG. 7 shows a welding state when the amount of heat input is further increased from that of the second' type.

If the welding state of the welded part ER is observed from thereabove, the positions and separation situations of three points of the geometrically V-shaped convergence point $V_0$, the physical abutment point $V_1$, and the welding point W vary depending on the amount of heat input. The geometrically V-shaped convergence point $V_0$ is a point where approximated straight lines of both the abutment end portions 7a and 7b of the steel sheet 6 converging in a V-shape intersect each other geometrically. More specifically, when the geometrically V-shaped convergence point $V_0$ is found, in the welding operation monitoring device 4, portions of the abutment end portions 7a and 7b specified from the color image captured by the image capturing device 3 are linearly approximated, respectively, and an intersection point between a pair of approximated straight lines obtained in this way is defined as the geometrically V-shaped convergence point $V_0$.

In addition, when the geometrically V-shaped convergence point $V_0$ is found, which ranges of the abutment end portions 7a and 7b are to be linearly approximated are determined in advance. For example, referring to FIG. 5(B), the ranges where the abutment end portions 7a and 7b are linearly approximated can be determined as optional ranges from left ends (of the paper surface) of the abutment end portions 7a and 7b on the upstream side in the conveyance direction X of the steel plate 6 to the physical abutment point $V_1$ on the downstream side in the conveyance direction X within the color image captured by the image capturing device 3. For example, the abutment end portions 7a and 7b may be linearly approximated in a range of 50% of the distance from the left ends of the abutment end portions 7a and 7b to the physical abutment point $V_1$ within the color image.

The physical abutment point $V_1$ is a point in which both the abutment end portions 7a and 7b of the steel sheet 6 converging in a V-shape physically abut (contact) against each other. The welding point W is a point where the discharge of the molten steel caused by the depression of a squeeze roll 8 starts. In a case where the welding state of the welded part ER of the plasma shield electric resistance welding is the first type of state, as shown in FIG. 5(A), three points of the geometrically V-shaped convergence point $V_0$, the physical abutment point $V_1$, and the welding point W substantially overlap each other.

In a case where the welding state of the welded part ER of the plasma shield electric resistance welding is the excessive heat input state from the second type of state, as shown in FIGS. 5(B) to 7, the geometrically V-shaped convergence point $V_0$ and the welding point W are separated from each other, and a long and narrow gap referred to as a slit S is generated. Moreover, in a case where the welding state of the welded part ER of the plasma shield electric resistance welding is an excessive heat input state from a transition region state, as shown in FIGS. 6(A) to 7, the geometrically V-shaped convergence point $V_0$ and the physical abutment point $V_1$ are separated from each other. In a case where the welding state of the welded part ER of the plasma shield electric resistance welding is the second' type of state, as shown in FIG. 6(B), the V-shaped region has a characteristic shape having a two-stage V-shaped convergence angle. In this way, a phenomenon in which the V-shaped region has a two-stage V-shaped convergence angle is referred to as a two-stage convergence phenomenon.

In a case where the welding state of the welded part ER of the plasma shield electric resistance welding is the transition region state, as shown in FIG. 6(A), a region where the distance between both the abutment end portions 7a and 7b is extremely narrow are formed in the V-shaped region formed by both the abutment end portions 7a and 7b and the physical abutment point $V_1$. Due to this, the physical abutment point $V_1$ fluctuates between the geometrically V-shaped convergence point $V_0$ and the welding point W. In this case, if the physical abutment point $V_1$ hops to the upstream side (left side of the paper surface) in the conveyance direction X, an electromagnetic force on the downstream side in the conveyance direction X of the steel sheet 6 disappears. In this case, there is a tendency that the oxides of both the abutment end portions 7a and 7b are no longer discharged and welding defects increase.

In a case where the welding state of the welded part ER by the plasma shield electric resistance welding is excessive heat input, as shown in FIG. 7, the welding point W may approach the position of the squeeze roll 8. Therefore, there is a tendency that the discharge of the oxides is no longer performed appropriately, and welding defects increase in the welded part ER. In the welding operation monitoring system 1 according to the present embodiment, the geometrically V-shaped convergence point $V_0$, the physical abutment point $V_1$, and the welding point W, of which the positions move depending on the differences in the amount of heat input in the welded part ER, can be detected by the welding operation monitoring device 4 on the basis of the color image obtained by the image capturing device 3.

<Configuration of Plasma Flow Supply Device>

Figure 8:
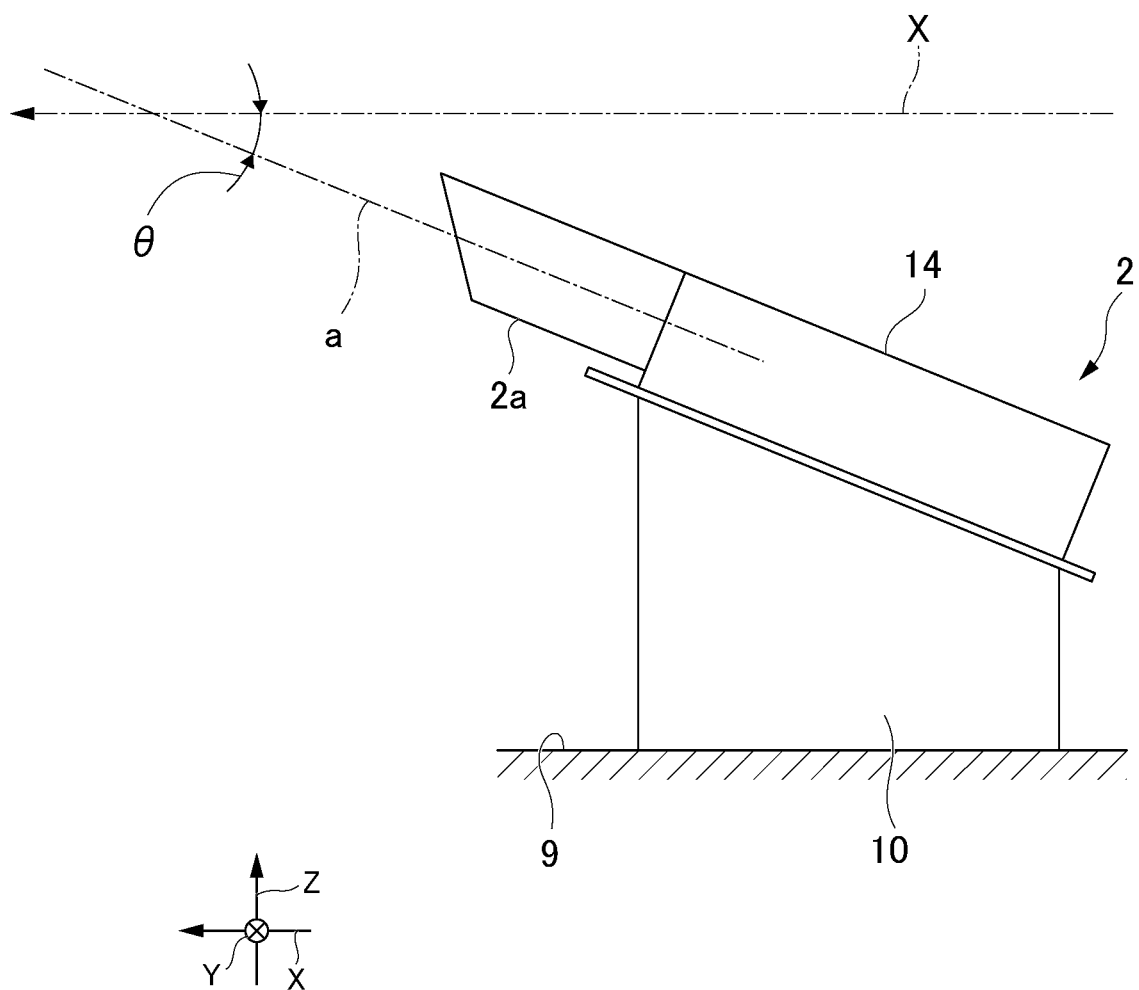
FIG. 8 is a side view showing a schematic configuration of the plasma flow supply device of the first embodiment.

Next, a plasma flow supply device 2 used in combination with the welding operation monitoring system 1 of the present embodiment will be described. The plasma flow supply device 2 is of an in-pipe installation type installed inside the pipe of the steel sheet 6, and as shown in FIG. 8, can be installed on a mandrel 9 disposed inside the pipe of the steel sheet 6 formed in a tubular shape. The plasma flow supply device 2 includes a base 10 installed on the mandrel 9, and a plasma flow supply machine 14 installed on the base 10.

The base 10 can adjust the supply position or the like of the plasma flow to the steel sheet 6 by adjusting the disposition position and disposition angle of the plasma flow supply machine 14.

Specifically, as the base 10 horizontally moves to the upstream side or the downstream side in the conveyance direction (the X direction of FIG. 8) of the steel sheet 6, the plasma flow supply machine 14 also moves horizontally, and as a result, the position of the centerline a of the plasma flow can be adjusted in the X direction.

Additionally, as the base 10 moves upward and downward, the plasma flow supply machine 14 also moves upward and downward, and as a result, the position of the centerline a of the plasma flow can be adjusted in an upward-downward direction (the Z direction shown in FIG. 1).

Additionally, the centerline a of the plasma flow can be adjusted in a horizontal direction (Y direction shown in FIG. 1) by horizontally moving the plasma flow supply machine 14 relative to the base 10. In addition, the supply position of the plasma flow in the horizontal direction (Y direction shown in FIG. 1) may be adjusted by swinging the plasma flow supply machine 14 instead of horizontally moving the plasma flow supply machine 14.

Additionally, as the base 10 tilts in the upward-downward direction, the plasma flow supply machine 14 also tilts in the upward-downward direction, and as result, a tip angle (hereinafter referred to as a plasma flow supply angle) θ shown in FIG. 8 can be adjusted.

Moreover, by moving the plasma flow supply machine 14 along the centerline a relative to the base 10, the plasma flow supply machine 14 can be brought close to the welded part ER or the plasma flow supply machine 14 can be kept away from the welded part ER, and the plasma flow can be supplied at an optimal distance.

In addition, the above respective operation of the base 10 is configured to receive an instruction from the welding operation monitoring device 4 and be electrically performed.

The plasma flow supply angle θ is an angle formed by the centerline a of the plasma flow supplied from the tip of the plasma flow supply machine 14 and the conveyance direction X and viewed from a side, and is desirably 30 degrees or less. By setting the plasma flow supply angle θ to 30 degrees or less, the length of the abutment end portions 7a and 7b (also referred to as a melting edge) shielded by the plasma flow is sufficiently secured, and it is possible to ensure welding quality by preventing the oxidation of the abutment end portions 7a and 7b.

The plasma flow supply device 2 can adjust the supply position of the plasma flow so as to match the optimal position of the welded part ER by adjusting the disposition of the plasma flow supply machine 14 along in the conveyance direction X, the disposition thereof in the Y direction, the disposition thereof in the Z direction, the plasma flow supply angle θ, and the like. Incidentally, it is preferable that the plasma flow supplied from the plasma flow supply machine 14 has a diameter of about 20 [mm] or more at the spray target position thereof, and the disposition of the plasma flow supply machine 14 in the conveyance direction X, the disposition thereof in the Y direction, the disposition thereof in the Z direction, the plasma flow supply angle θ, and the like can be adjusted so that the plasma flow of this diameter can be supplied to the optimal position of the welded part ER.

<Configuration of Welding Operation Monitoring Device>

Figure 9:
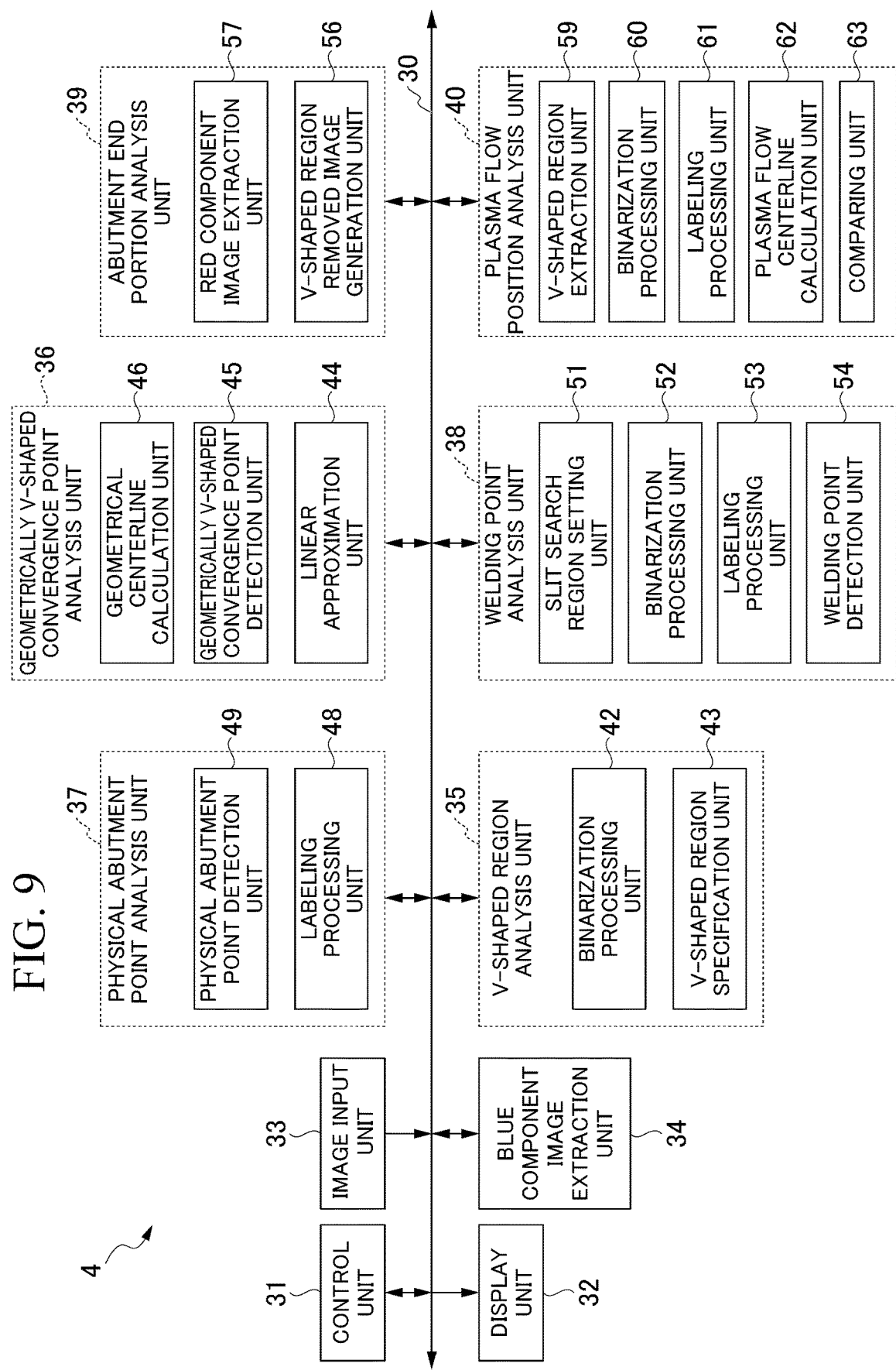
FIG. 9 is a block diagram showing a circuit configuration of a welding operation monitoring device of the embodiment.

Next, the welding operation monitoring device 4 will be described. As shown in FIG. 9, the welding operation monitoring device 4 has a configuration in which a control unit 31 constituting a microcomputer including a central processing unit (CPU), a read only memory (ROM), a random access memory (RAM), and the like that are not shown, a display unit 32, an image input unit 33, a blue component image extraction unit 34, a V-shaped region analysis unit 35, a geometrically V-shaped convergence point analysis unit 36, a physical abutment point analysis unit 37, a welding point analysis unit 38, an abutment end portion analysis unit 39 and a plasma flow position analysis unit 40 are connected to each other via a bus 30.

If various operation commands are given from an operator to the operation unit that is not shown, the control unit 31 controls respective circuit parts according to a welding operation analysis processing program or a plasma flow position analysis processing program by appropriately reading the welding operation analysis processing program, the plasma flow position analysis processing program, or the like, which is stored in advance in the ROM, on the basis of the operation commands, and developing the read program in the RAM. The control unit 31 can display execution results of the welding operation analysis processing program or the plasma flow position analysis processing program on the display unit 32, and can make the operator know the state of the welding operation or the plasma flow supply position via the display unit 32.

The image input unit 33 is connected to the image capturing device 3, and sends the color image to the RAM of the control unit 31, the blue component image extraction unit 34, or the like if the color image obtained by the image capturing device 3 is input. The blue component image extraction unit 34 generates the blue component image obtained by extracting the blue component from the color image input from the image capturing device 3. Here, in a case where the melting edges (abutment end portions 7a and 7b) in radio-frequency electric heating are detected (FIG. 3(A)) under the conditions that the luminance of the image captured by the image capturing device 3 is not saturated, the respective luminance values of the red component R, the green component G, and the blue component B have the following ratio.

R:G:B=1.0:0.6:0.2

Additionally, in a case where a plasma flow portion is detected from the color image (FIG. 4(A)), the respective luminance values of the plasma flow portion have the following ratio. In addition, the above and following ratios of the respective luminance values of the red component R, the green component G, and the blue component B show absolute maximum values, respectively, and vary slightly within ranges that do not exceed the absolute maximum values depending on situations.

R:G:B=0.5:0.5:1.2

For example, it is desirable to obtain the blue component image, using the luminance of about half or more (more than 0.2) of the red component level "1.0" of the melting edges as a threshold value when the blue component is extracted from the color image to binarize the blue component image under preset capturing conditions (conditions that the luminance of the image captured by the image capturing device 3 is not saturated when the melting edges are imaged). As a result, a V-shaped display region ER1 sandwiched between steel pipe edges 70a and 70b can be obtained as a plasma region where blue luminance is strong by the binarization of the blue component image.

In addition, if a relationship between the V-shaped display region ER1 and the above V-shaped region ERv will be described, the V-shaped region ERv means a real object of the V-shaped region formed by the abutment end portions 7a and 7b, and on the other hand, the V-shaped display region ER1 means a video obtained by capturing the V-shaped region ERv.

In the blue component extracted from the color image, it is desirable that the wavelength is 380 [nm] to 550 [nm], and more preferably, 380 [nm] to 500 [nm] including a main emission band (391 [nm], 410 [nm], 427 [nm], 434 [nm], 486 [nm], or the like) of a plasma gas to be used.

Figure 10:
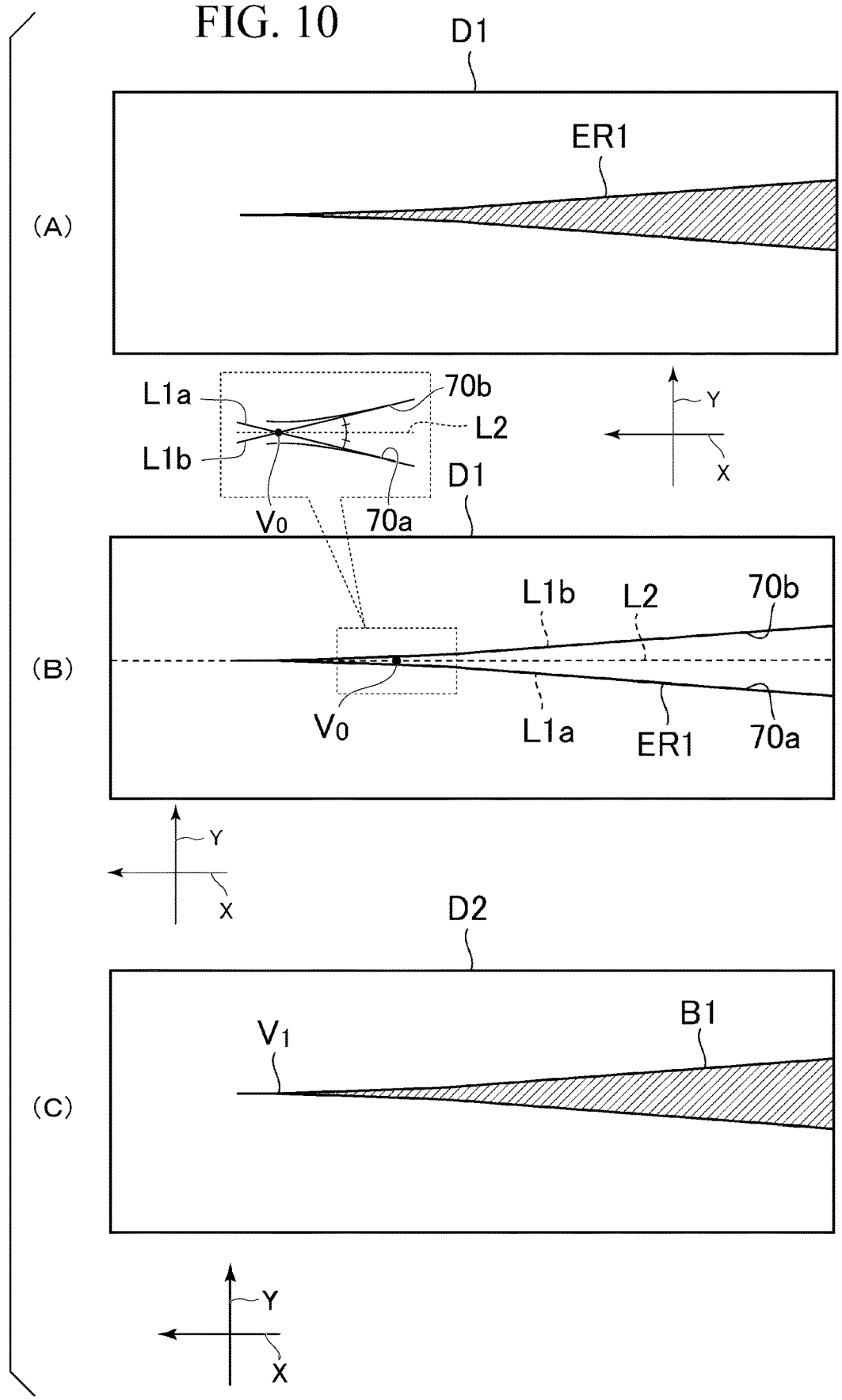
FIG. 10(A) is a schematic view showing binarizing an extracted blue component to specify a V-shaped display region.
FIG. 10(B) is a schematic view showing detecting a geometrically V-shaped convergence point and calculating a geometrical centerline.
FIG. 10(C) is a schematic view showing detecting a physical abutment point.

The V-shaped region analysis unit 35 performs binarization processing of the blue component image obtained by the blue component image extraction unit 34 by the binarization processing unit 42, performs edge enhancement processing as necessary, and generates a blue component binarized image D1 as shown in FIG. 10(A). Here, since the blue component binarized image D1 is obtained by binarizing the blue component image where the region where the plasma flow is visible over the V-shaped region ERv is shown by the blue component, the V-shaped display region ER1 is displayed in a pixel region equivalent to the V-shaped region ERv. For example, as the blue component binarized image D1, pixel values "1" are given to pixels in which the luminance of received light is equal to or more than a predetermined threshold value, and pixel values "0" are given to the remaining pixels of less than the predetermined threshold value. The V-shaped region analysis unit 35, specifies, for example, a pixel region where the luminance of the received light is equal to or more than the predetermined threshold value within the blue component binarized image D1 generated by the binarization processing unit 42 as the V-shaped display region ER1 equivalent to the V-shaped region ERv, using the V-shaped region specification unit 43.

The geometrically V-shaped convergence point analysis unit 36 linearly approximates both edges, converged in a V-shape, of the V-shaped display region ER1 specified by the V-shaped region analysis unit 35, using the linear approximation unit 44. Here, both the edges of the V-shaped display region ER1 that are converged in a V-shape are equivalent to the abutment end portions 7a and 7b of the V-shaped region ERv in the steel sheet 6. For that reason, as shown in FIG. 10(B), approximated straight lines L1a and L1b of both the steel pipe edges 70a and 70b of the V-shaped display region ER1 can be regarded as approximated straight lines of the abutment end portions 7a and 7b (FIG. 5, FIG. 6) of the V-shaped region ERv in the steel sheet 6.

The geometrically V-shaped convergence point analysis unit 36 detects an intersection point between the approximated straight lines L1a and L1b as the geometrically V-shaped convergence point $V_0$ (FIG. 10(B)), using the geometrically V-shaped convergence point detection unit 45. Additionally, the geometrically V-shaped convergence point analysis unit 36 calculates a bisector of an angle (V-shaped convergence angle) formed by the approximated straight lines L1a and L1b found from the blue component binarized image D1, and the geometrically V-shaped convergence point $V_0$ as a geometrical centerline L2 (FIG. 10(B)), using the geometrical centerline calculation unit 46.

The physical abutment point analysis unit 37 performs the labeling processing of allocating a label to each blob on the blue component binarized image D1 obtained by the V-shaped region specification unit 43, using a labeling processing unit 48.

The blob referred to herein means, in a case where pixels to which pixel values "1" are given are adjacent to each other, in any of eight adjacent pixels including four pixels adjacent, in oblique directions, to four pixels adjacent to a certain pixel in upward, downward, leftward, and downward directions, each coupling region obtained by performing coupling the pixels for the respective pixels.

Additionally, the labeling processing is the processing of allocating label numbers to the individual blobs to extract a specific blob and extracting the position, width, length, area, and the like of the extracted blob within the image. The physical abutment point analysis unit 37 extracts a blob satisfying predetermined conditions as a blob B1 indicating the V-shaped region ERv formed by the abutment end portions 7a and 7b of the steel sheet 6 from the inside of the labeling-processed image D2, as shown in FIG. 10(C), using the physical abutment point detection unit 49.

Conditions for determining that the blob B1 indicates the V-shaped region ERv are, for example, conditions that the blob is not in contact with a left end of the image D2 and in contact with only a right end of the image D2, the area is equal to or more than 50 [mm$^2$], and a value (aspect ratio) obtained by dividing the longitudinal (the Y direction orthogonal to the conveyance direction X) length of the blob by the lateral (conveyance direction X) length of the blob is equal to or less than 0.2. If the blob B1 indicating the V-shaped region ERv is extracted on the basis of the conditions, the physical abutment point analysis unit 37 detects a most downstream point of the blob B as the physical abutment point $V_1$.

The abutment end portion analysis unit 39 generates a V-shaped region removed color image obtained by removing an image portion of the V-shaped display region ER1 specified by the V-shaped region analysis unit 35 from the color image input from the image capturing device 3, using the V-shaped region removed image generation unit 56. The abutment end portion analysis unit 39 extracts the red component from the V-shaped region removed color image to generate a V-shaped region removed analysis image D3 as shown in FIG. 111(A), using the red component image extraction unit 57.

Figure 11:
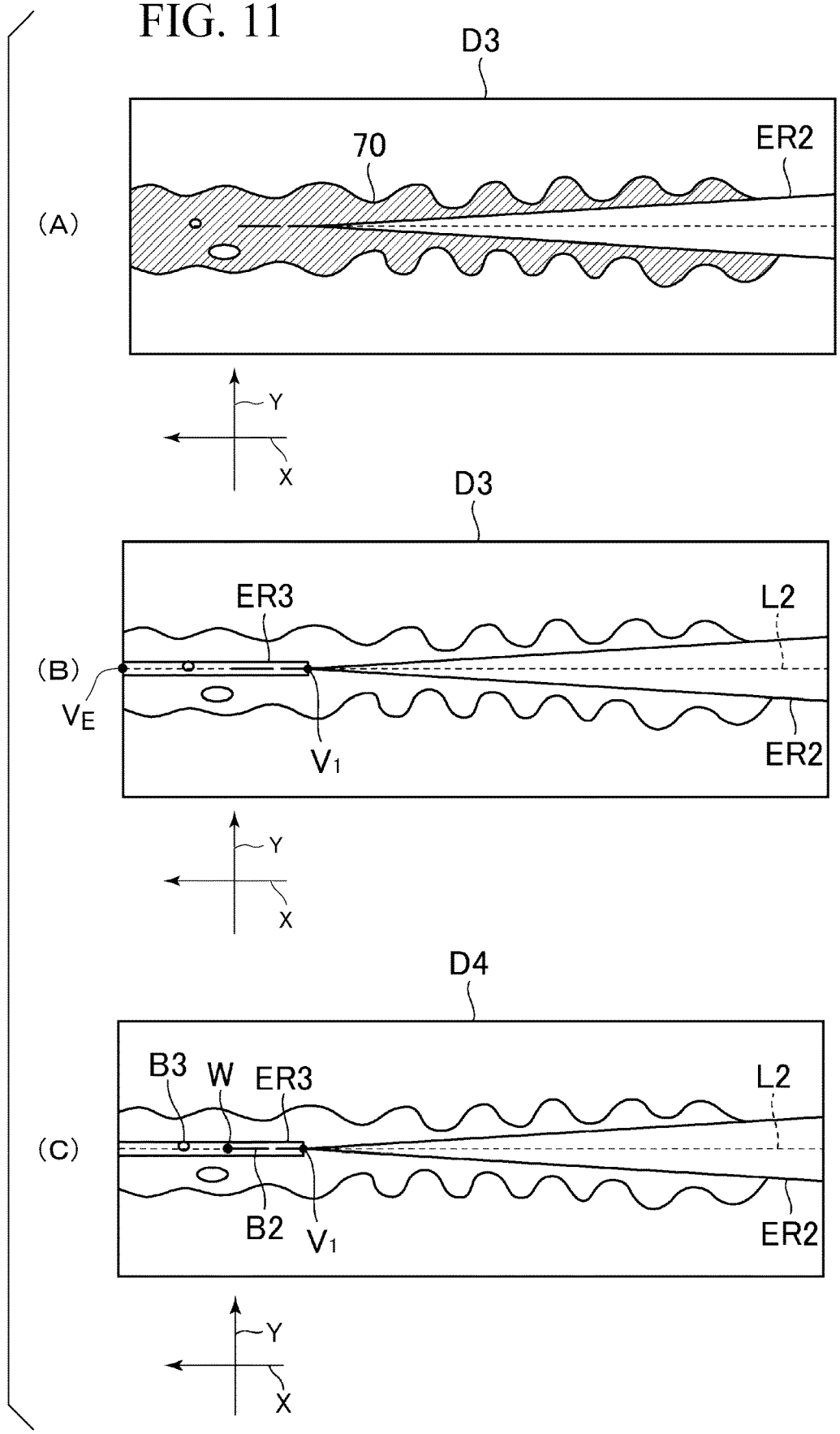
FIG. 11(A) is a schematic view showing setting a slit search region.
FIG. 11(B) is a schematic view showing the slit search region.
FIG. 11(C) is a schematic view showing detecting a welding point.

As shown in FIG. 11(A), a V-shaped removal region ER2 from which the image portion of the V-shaped display region ER1 (FIG. 10(A)) is removed is shown in the V-shaped region removed analysis image D3 formed of the red component, and the state of a welding bead part 70 and the like appearing the surface of the welded part ER of the steel sheet 6 is displayed in the shading of the red component in the other region. Additionally, it is desirable that the red component when portions, such as the welding bead part 70, are extracted from the color image has a wavelength of 550 [nm] to 1100 [nm] and more preferably a wavelength in which the separation from the blue component image is sufficient and the main emission band of the plasma gas is seldom included. Therefore, particularly, it is desirable that the wavelength is 600 [nm] to 740 [nm].

The welding point analysis unit 38 sets a slit search region ER3 within the V-shaped region removed analysis image D3 of the red component as shown in FIG. 11(B), using a slit search region setting unit 51. Here, in a case where the abutment end portions 7a and 7b of the steel sheet 6 are butted against each other and one portion, which is linearly observed, is a weld line, it is assumed that the weld line is located on the geometrical centerline L2 that is the bisector of the V-shaped convergence angle obtained by the geometrically V-shaped convergence point analysis unit 36. In the case of the present embodiment, the slit search region setting unit 51 sets a rectangular region, through which the geometrical centerline 12 runs in a longitudinal direction thereof, to the slit search region ER3.

Specifically, in the longitudinal direction that extends in the conveyance direction X in the slit search region ER3, the physical abutment point $V_1$ detected by the physical abutment point analysis unit 37 is defined as upstream end of the slit search region ER3, and a downstream end of the V-shaped region removed analysis image D3 is defined as a downstream end Vs of the slit search region ER3. Additionally, it is desirable to have a region having a predetermined width (for example, 2 [mm]) around the geometrical centerline L2 in the Y direction orthogonal to the longitudinal direction of the slit search region ER3.

The welding point analysis unit 38 performs the binarization processing of the V-shaped region removed analysis image D3, in which the slit search region ER3 is set, using the binarization processing unit 52, and then, performs the labeling processing of allocating a label to each blob on the binarized V-shaped region removed analysis image D3, using a labeling processing unit 53. The welding point analysis unit 38 calculates the aspect ratio of each labeling-processed blob, using the welding point detection unit 54. As shown in FIG. 11(C), the welding point analysis unit 38 detects the most downstream point of a blob B2, which is present on the most downstream side in the conveyance direction X of the steel sheet 6 among respective blobs having an aspect ratio of less than 1/2 in the slit search region ER3 within the binarized V-shaped region removed analysis image D4, as the welding point W.

In a case where it is determined that no blob having an aspect ratio of less than 1/2 is present within the V-shaped region removed analysis image D4, the welding point detection unit 54 connects respective blobs on the geometrical centerline L2 to each other, and then, detects the most downstream point of the connected blob in the conveyance direction X of the steel sheet 6 as the welding point W.

In this way, by detecting the welding point W on the basis of the aspect ratio of the blobs, the welding point detection unit 54 can detect the welding point W while excepting for the blob B3 resulting from noise for example, even in a case where a blob B3 resulting from noise is within the slit search region ER3 as shown in FIG. 11(C).

The plasma flow position analysis unit 40 extracts only the red component in the portion of the V-shaped display region ER1 (FIG. 10(A)) specified by the V-shaped region analysis unit 35 from the color image input from the image capturing device 3 to generate an intra-V-shaped-region analysis image, using the V-shaped region extraction unit 59. The intra-V-shaped-region analysis image is the red component of the plasma flow that is visible over the V-shaped region, and has a higher luminance as approaching a central portion of the plasma flow. Here, the intra-V-shaped-region analysis image is an image used to specify a center region (plasma flow center region) to be the center, in the region to which the plasma flow inside the V-shaped region ERv is supplied. Additionally, in the red component extracted only from the portion of the V-shaped display region ER1 within the color image, particularly, it is desirable that the wavelength is 640 [nm] to 780 [nm] because it is desirable that the wavelength is 550 [nm] to 1100 [nm] and more preferably a wavelength in which the separation from the blue component image is insufficient and the main emission band of the plasma gas is included.

Figure 12:
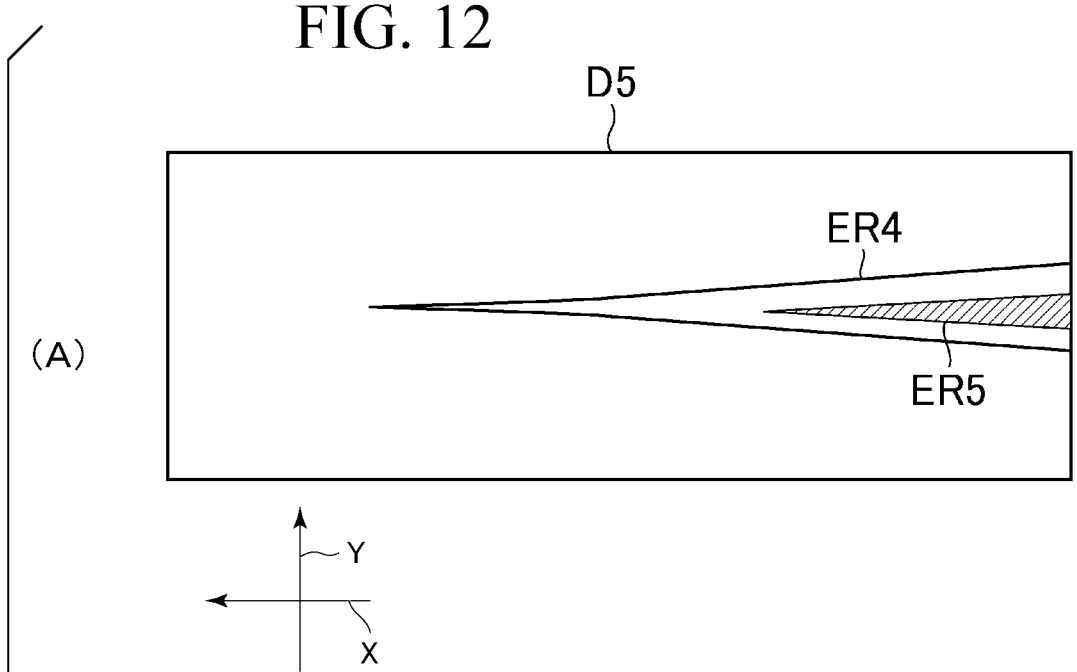
FIG. 12(A) is a schematic view showing specifying a plasma flow center region.
FIG. 12(B) is a schematic view showing calculating a plasma flow centerline.
Figure 12:
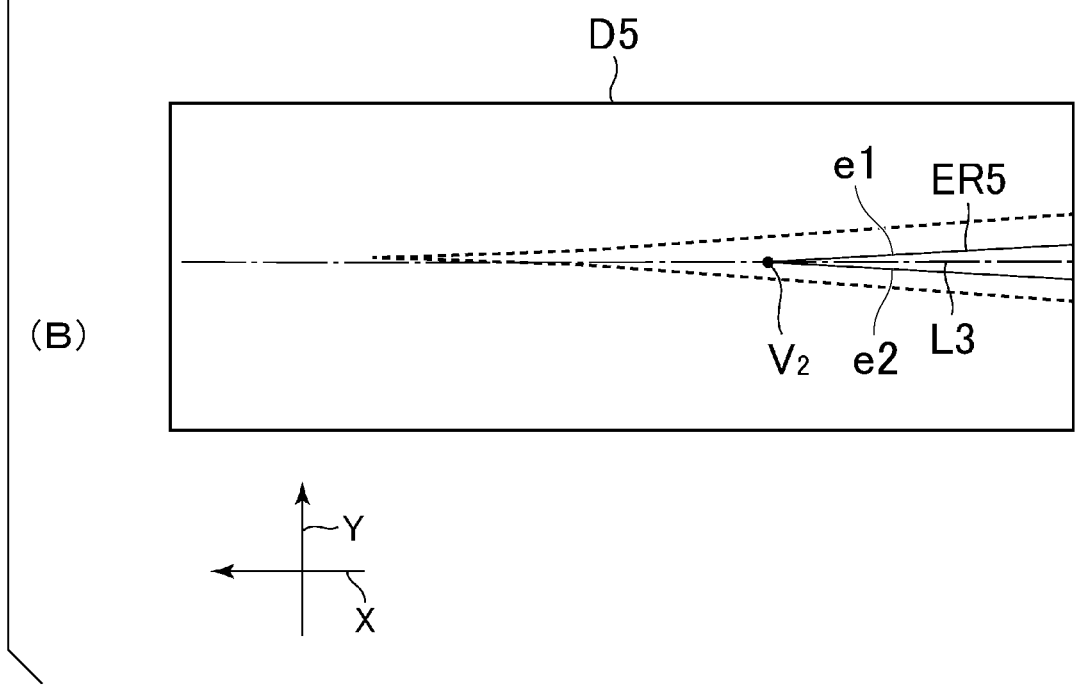

The plasma flow position analysis unit 40 performs the binarization processing of the intra-V-shaped-region analysis image of the red component, using the binarization processing unit 60, and as shown in FIG. 12(A), generates a binary intra-V-shaped-region analysis image D5 in which a plasma flow center region ER5 having high luminance is expressed by light and darkness within the V-shaped display region ER4 extracted from the color image. Here, in a case where the melting edges subjected to the radio-frequency electric heating are detected as shown in FIG. 3(A) under conditions that the luminance of the image captured by the image capturing device 3 is not saturated, as described above, the ratio of absolute maximum values of the respective luminance values of the red component R, the green component G, and the blue component B in melting edges is as follows.

R:G:B=1.0:0.6:0.2

Additionally, as described above, in a case where the plasma flow portion (FIG. 4(A)) is detected, the ratio of the absolute maximum values of the respective luminance values is as follows.

R:G:B=0.5:0.5:1.2

For that reason, for example, the luminance of the red component R of the plasma flow portion is about "0.5" with respect to the level "1.0" of the luminance of the red component of the melting edges under the preset capturing conditions (conditions that the luminance of the image captured by the image capturing device 3 when the melting edge parts are captured is not saturated). Thus, if the intra-V-shaped-region analysis image of the red component is obtained such that the threshold value of the luminance when the red component is extracted from the portion of the V-shaped display region ER1 of the color image is about 0.1 to 0.3 times (a value smaller than 0.5 times) the luminance of the red component R of the melting edges, and the intra-V-shaped-region analysis image is further binarized, as shown in FIG. 12(A), the intra-V-shaped-region analysis image D5 in which the plasma flow center region ER5 is divided into light and darkness by the binarization can be obtained.

The plasma flow position analysis unit 40 performs the labeling processing of allocating a label to each blob on the binarized intra-V-shaped-region analysis image D5, using the labeling processing unit 61, and extracts a blob satisfying the predetermined conditions as a blob of the plasma flow center region ER5. In addition, conditions for determining a blob as the blob of the plasma flow center region ER5 are, for example, conditions that the blob is not in contact with a left end of the intra-V-shaped-region analysis image D5 and in contact with only a right end of the intra-V-shaped-region analysis image D5, the area is equal to or more than 20 [mm$^2$], and a value (aspect ratio) obtained by dividing the longitudinal (the Y direction orthogonal to the conveyance direction X) length of the blob by the lateral length (conveyance direction X) of the blob is equal to or less than 0.2.

The plasma flow position analysis unit 40 calculates a plasma flow centerline 1L3 that is a central axis in a longitudinal direction of the plasma flow center region ER5 and which extends toward the conveyance direction X side, as shown in FIG. 12(B), using the plasma flow centerline calculation unit 62. Here, as a method of calculating such a plasma flow centerline L3, for example, when the blob of the plasma flow center region ER5 within the intra-V-shaped-region analysis image D5 has a V-shaped convergence shape, an intersection point between approximated straight lines obtained linearly approximating both plasma edges e1 and e2 that are converged in a V-shape is detected as a plasma flow center tip point V2. Next, the plasma flow centerline calculation unit 62 calculates a bisector of an angle (plasma flow V-shaped convergence angle) formed by the pair of plasma edges e1 and e2 linearly approximated by the intra-V-shaped-region analysis image D5, and the plasma flow center tip point V2 as the plasma flow centerline L3.

The comparing unit 63 of the plasma flow position analysis unit 40 can compare the physical abutment point $V_1$ calculated by the physical abutment point detection unit 49 with the plasma flow centerline 13, and determine whether or not the physical abutment point $V_1$ deviates from on an extension line of the plasma flow centerline L3. For example, in a case where the relative positions of the physical abutment point $V_1$ and the plasma flow centerline L3 coincide with each other, the comparing unit 63 determines that the plasma flow is supplied to the optimal position where sufficient shielding effect is obtained for the welded part ER.

On the other hand, the comparing unit 63 for example, in a case where the physical abutment point $V_1$ deviates from on the extension line of the plasma flow centerline L3, determines that the plasma flow is not supplied to a position where a sufficient shielding effect is obtained with respect to the welded part ER.

In this way, basically, although suitability of the supply state of the plasma flow is determined on the basis of a relative positional relationship between the physical abutment point $V_1$ and the plasma flow centerline L3, the invention is not limited only to this form. For example, in a case where the direction of the geometrical centerline L2 and the direction of the plasma flow centerline L3 deviate relative to each other, a form in which the comparing unit 63 determines that plasma flow is not supplied to the welded part ER of the steel sheet 6 from a direction in which a sufficient effect is obtained can be adopted.

The welding operation monitoring device 4 can allow the display unit 32 to display detection results of the geometrically V-shaped convergence point $V_0$, the physical abutment point $V_1$, and the welding point W, and a determination result of whether or not the plasma flow centerline L3 deviates from the physical abutment point $V_1$, and allow the operator to analyze the welding operation. Incidentally, the welding operation monitoring device 4 not only may make the display unit 32 display the determination result of whether or not the plasma flow centerline L3 deviates from the physical abutment point $V_1$ but also may calculate position correction data required to make the plasma flow centerline L3 coincide with the physical abutment point $V_1$, to send the data to the plasma flow supply device 2, in the control unit 31. Accordingly, the plasma flow supply device 2 can correct the plasma flow supply angle 9 and the plasma flow supply position of the plasma flow supply machine 14, on the basis of the position correction data received from the welding operation monitoring device 4, and supply the plasma flow from a position and a direction that are optimal for the welded part ER.

Figure 13:
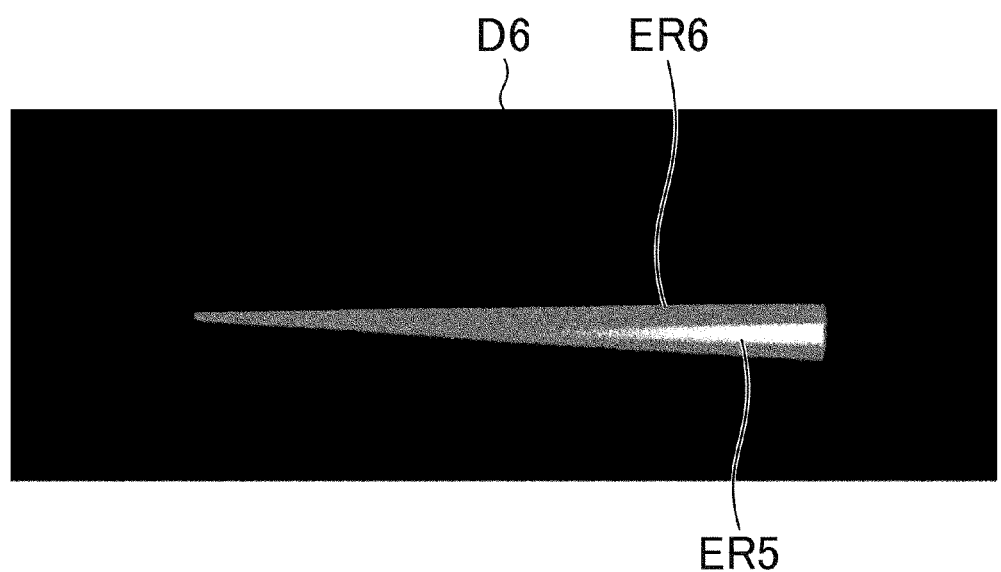
FIG. 13 is an image obtained by synthesizing: the plasma flow center region obtained by extracting and binarizing the red component and a green component within the V-shaped display region; and the blue component image showing the V-shaped display region.

Additionally, as shown in FIG. 13, the welding operation monitoring device 4 may generate a synthetic image D6 obtained by synthesizing the binarized plasma flow center region ER5 as shown in FIG. 12(A) on an image from which the blue component in the V-shaped region ERv is extracted and on which the V-shaped region ERv is displayed as a V-shaped display region ER6. As shown in FIG. 13, in the synthetic image D6, the plasma flow center region ER5 can be displayed within the V-shaped display region ER6 where the V-shaped region ERv in the welded part ER is displayed with the blue component. Hence, by making the display unit 32 display the plasma flow center region ER5, the operator can be made to intuitively know the deviation of the plasma flow center region ER5 visually.

Figure 14:
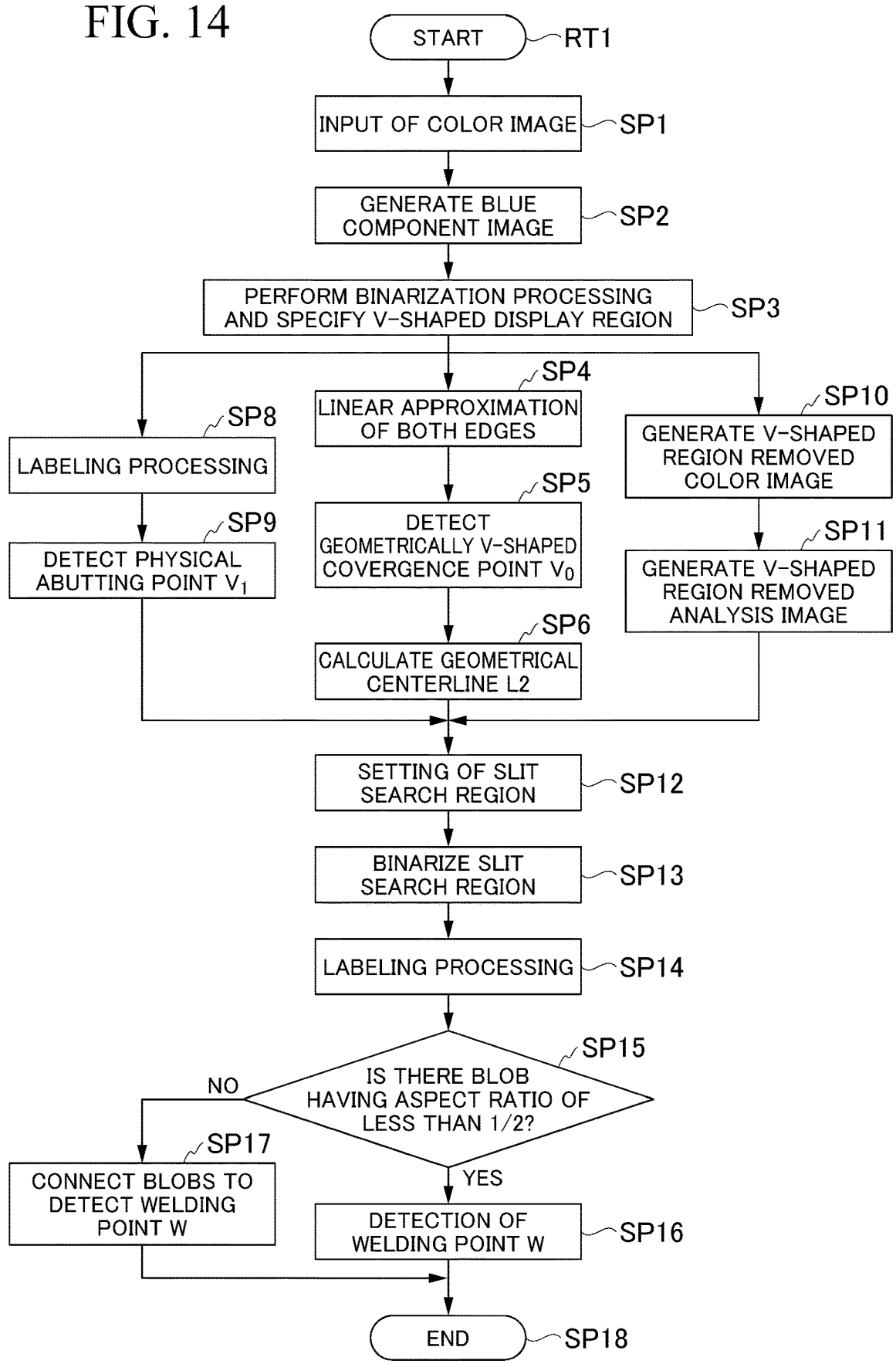
FIG. 14 is a flowchart showing a welding operation analysis processing procedure using the welding operation monitoring device.

The welding operation analysis processing using the welding operation monitoring system 1 having the configuration described above will be described below with reference to the flowchart of FIG. 14. In the welding operation analysis processing, the geometrically V-shaped convergence point $V_0$, the geometrical centerline L2, the physical abutment point $V_1$, the V-shaped region removed analysis image, and the welding point W are found.

Figure 15:
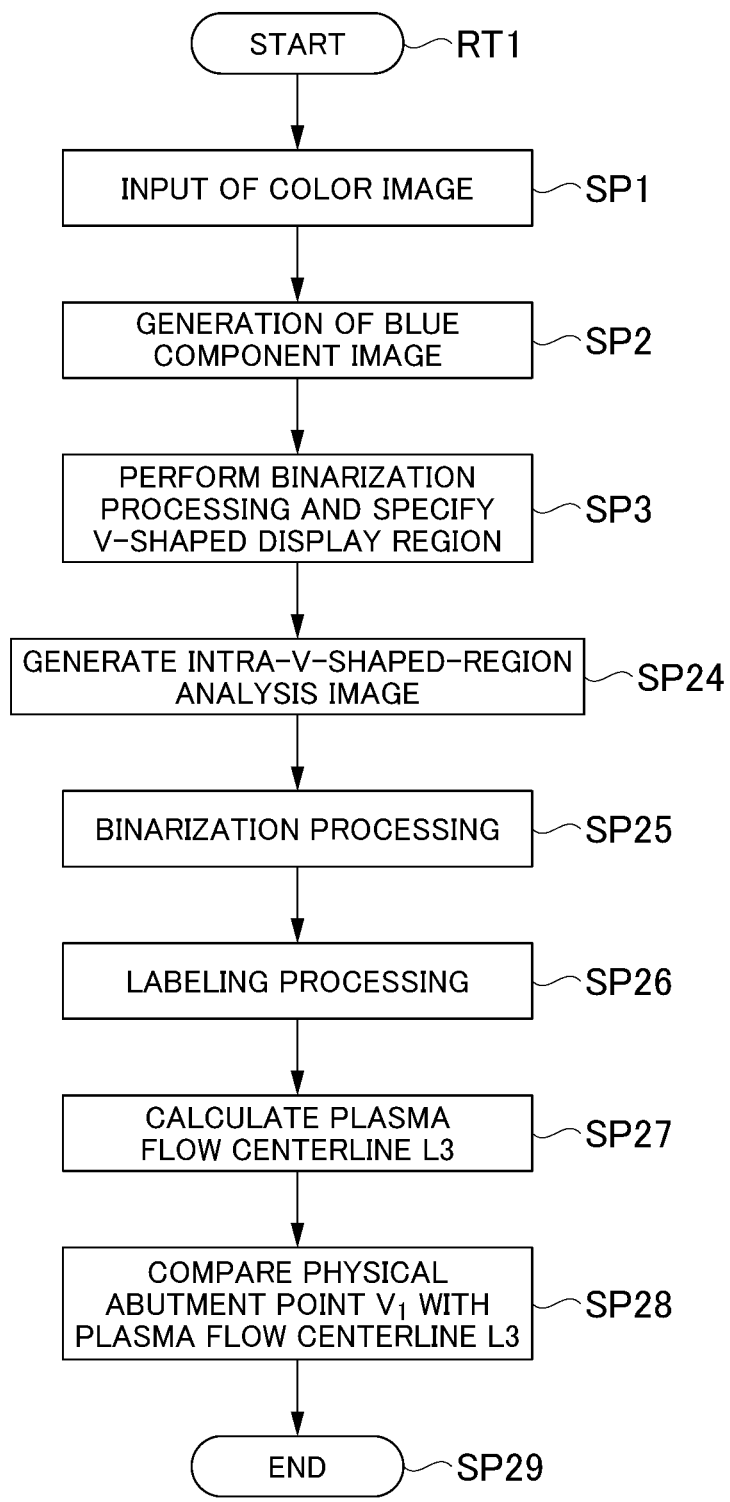
FIG. 15 is a flowchart showing a plasma flow position analysis processing procedure using the welding operation monitoring device.

Moreover, the plasma flow position analysis processing using the welding operation monitoring system 1 will also be described below with reference to the flowchart of FIG. 15. In the plasma flow position analysis processing, the positional deviation of the plasma flow centerline L3 with respect to the physical abutment point $V_1$ is found.

<Welding Operation Analysis Processing>

First, the welding operation analysis processing using the flowchart shown in FIG. 14 will be described. As shown in FIG. 14, if the welding operation monitoring device 4 enters from a start step of a routine RT1 and proceeds to Step SP1 and the color image is input from the image capturing device 3, the process proceeds to the next Step SP2. In Step SP2, the welding operation monitoring device 4 extracts the blue component from the color image input in Step SP1 to generate a blue component image, and proceeds to the next Step SP3.

Step SP3 to Step SP6 are the processing steps of calculating the geometrical centerline L2, and Step SP8 to Step SP9 are the processing steps of calculating the physical abutment point $V_1$. In Step SP3, the welding operation monitoring device 4 performs the binarization processing of the blue component image, performs the edge enhancement processing as necessary, specifies the pixel region indicating the V-shaped region ERv as the V-shaped display region ER1 within the blue component image, and proceeds to the next Step SP4, Step SP8 and Step SP10. In Step SP4, the welding operation monitoring device 4 linearly approximates both the edge lines, converged in a V-shape, of the V-shaped display region ER1, and proceeds to the next Step SP5.

In Step SP5, the welding operation monitoring device 4 detects the intersection point between the pair of approximated straight line L1a and L1b found in Step SP4 as the geometrically V-shaped convergence point $V_0$, and proceeds to the next Step SP6. In Step SP6, the welding operation monitoring device 4 calculates the bisector of the angle (V-shaped convergence angle) formed by the approximated straight lines L1a and L1b found in Step SP4 and the geometrically V-shaped convergence point $V_0$ detected in Step SP5 as the geometrical centerline L2 and proceeds to the next Step SP12.

On the other hand, in Step SP10, the welding operation monitoring device 4 removes the portion of the V-shaped display region ER1 obtained in Step SP3 from the color image obtained from the image capturing device 3 in Step SP1 to generate the V-shaped region removed color image, and proceeds to the next Step SP11. In Step SP11, the welding operation monitoring device 4 extracts the red component from the V-shaped region removed color image to generate the V-shaped region removed analysis image D3 in which the state of the welding bead part 70 or the like in the welded part surface of the steel sheet 6 is displayed in the shading of the red component, and proceeds to the next Step SP12.

Additionally, in Step SP8, the welding operation monitoring device 4 performs the labeling processing of allocating a label for each blob on the blue component binarized image obtained in Step SP3, and proceeds to the next Step SP9. In Step SP9, the welding operation monitoring device 4 extracts the blob satisfying the predetermined conditions from the blobs obtained by the labeling processing as the blob B1 indicating the V-shaped region ERv formed by the abutment end portions 7a and 7b of the steel sheet 6, detects the most downstream point of the blob B1 as the physical abutment point $V_1$, and proceeds to the next Step SP12.

In Step SP12, the welding operation monitoring device 4 sets the slit search region ER3 within the V-shaped region removed analysis image D3 obtained in Step SP11, and proceeds to the next Step SP13. In Step SP13, the welding operation monitoring device 4 performs the binarization processing of the V-shaped region removed analysis image D3 in which the slit search region ER3 is set, performs the labeling processing of allocating a label to each blob on the binarized V-shaped region removed analysis image D4 in the next Step SP14, and proceeds to the next Step SP15.

In Step SP15, the welding operation monitoring device 4 calculates the aspect ratio of each labeling-processed blob, and determines whether or not there is a blob having an aspect ratio of less than 1/2 within the slit search region ER3. If a positive result (SP15: YES) is obtained in Step SP15, this means that there is a blob having an aspect ratio of less than 1/2 within the slit search region ER3. In this case, the welding operation monitoring device 4 proceeds to the next Step SP16. In Step SP16, the welding operation monitoring device 4 detects the most downstream point of the blob B2, which is present on the most downstream side in the conveyance direction X of the steel sheet 6 among the blobs B2 having an aspect ratio of less than 1/2 within the slit search region ER3, as the welding point W, and proceeds to the next Step SP18 to end the above-described welding operation analysis processing procedure.

On the other hand, if a negative result (SP15: NO) is obtained in Step SP15, this means that there is no blob having an aspect ratio of less than 1/2 within the slit search region ER3. In this case, the welding operation monitoring device 4 proceeds to the next Step SP17. In Step SP17, the welding operation monitoring device 4 connects blobs on the geometrical centerline L2 to each other, then detects the most downstream point of the connected blob in the conveyance direction X of the steel sheet 6 as the welding point W, and proceeds to the next Step SP18 to end the above-described welding operation analysis processing procedure.

In the welding operation monitoring method of the present embodiment, the welding operation monitoring is performed according to the flow described above. That is, in the welding operation monitoring method, a welding operation is monitored when the pair of abutment end portions 7a and 7b is converged in a V-shape while the steel sheet 6 is formed in a tubular shape and the electric resistance welding is performed while supplying the plasma flow to the welded part ER including the V-shaped region ERv to perform shielding. In that case, the processes are performed which include: an image capturing step of capturing the color image including the plasma flow over the V-shaped region ERv from the pipe outside opposite to the pipe inside to which the plasma flow is supplied out of the pipe inside and the pipe outside of the steel sheet 6 formed in a tubular shape; and a welding operation monitoring step of extracting a specific color component from the color image to generate a specific color component image, and specifying the V-shaped display region ER1, which is a region corresponding to the V-shaped region ERv within the color image, on the basis of the V-shaped region ERv displayed in the specific color component image, thereby analyzing the state of the welding operation.

Moreover, in the welding operation monitoring step, as described in the subsequent plasma flow position analysis processing, a blue component image is generated as the specific color component image, the red component image or a green component image or a combination thereof is extracted from the color image of the V-shaped region ERv portion, and the plasma flow center region ER5 of the plasma flow is specified from the shading of the extracted red component image or the green component image or a combination thereof.

<Plasma Flow Position Analysis Processing>

Next, the plasma flow position analysis processing procedure using the flowchart shown in FIG. 15 will be described. As shown in FIG. 15, the welding operation monitoring device 4 enters from a start step of a routine RT2, and according to the above-described Step SP1 to Step SP3, extracts the blue component from the color image input from the image capturing device 3, then performs the binarization processing of the obtained blue component image, performs the edge enhancement processing as necessary, and specifies the pixel region indicating the V-shaped region ERv as the V-shaped display region ER1, and proceeds to the next Step SP24.

In Step SP24, the welding operation monitoring device 4 extracts only the red component in the portion of the V-shaped display region ER1 specified in Step SP3 from the color image input from the image capturing device 3 to generate the intra-V-shaped-region analysis image, and proceeds to the next Step SP25. In Step SP25, the welding operation monitoring device 4 performs the binarization processing of the intra-V-shaped-region analysis image of the red component, generates the binary intra-V-shaped-region analysis image D5 in which the plasma flow center region ER5 having high luminance is expressed by light and darkness, and proceeds to the next Step SP26. In Step SP26, the welding operation monitoring device 4 performs the labeling processing of allocating a label to each blob D5 on the intra-V-shaped-region analysis image, and proceeds to the next Step SP27.

In addition, in the above Step SP24, the red component of the V-shaped display region ER1 portion specified in Step SP3 is extracted. However, the green component may be extracted instead of the red component. Even in a case where the green component is extracted instead of a red component, the processing after Step SP25 subsequent to Step SP24 can be similarly performed. Moreover, in the above Step SP24, by extracting both the red component and the green component to perform the same processing for each component and using these two results together, the calculation accuracy may be further improved.

In Step SP27, the welding operation monitoring device 4 extracts a blob satisfying the predetermined conditions as the blob of the plasma flow center region ER5, then calculates and finds the plasma flow centerline L3 on the basis of this blob, and proceeds to the next Step SP28. In Step SP27, for example, the bisector of the plasma flow V-shaped convergence angle is calculated as the plasma flow centerline L3 from the pair of approximated straight lines obtained by linearly approximating both the plasma edges e1 and e2 of the blob of plasma flow center region ER5 that are converged in a V-shape, respectively, and the plasma flow center tip point V2 that is the intersection point between the pair of approximated straight lines.

In Step SP28, the welding operation monitoring device 4 compares the physical abutment point $V_1$ obtained in the above-described Step S9 with the plasma flow centerline L3 calculated in Step SP27. Then, after whether or not the plasma flow centerline L3 deviates from the physical abutment point $V_1$ is determined and the determination result is obtained, the process proceeds to the next Step SP29 where the plasma flow position analysis processing procedure is ended.

Summary of First Embodiment

The main points of the welding operation monitoring system 1 of the present embodiment are summarized below.

The welding operation monitoring system 1 monitors the welding operation when the pair of abutment end portions 7a and 7b is converged in a V-shape while the steel sheet (strip-shaped steel sheet) 6 is formed in a tubular shape and the electric resistance welding is performed while supplying the plasma flow to the welded part ER including the V-shaped region ERv to perform shielding.

Also, the welding operation monitoring system 1 includes the image capturing device 3 and the welding operation monitoring device 4. The image capturing device 3 captures the color image that is disposed on the outside the pipe opposite to the pipe inside to which the plasma flow is supplied out of the pipe inside and the pipe outside of the steel sheet 6 formed in a tubular shape and includes the plasma flow over the V-shaped region ERv. Additionally, the welding operation monitoring device 4 extracts the specific color component from the color image to generate the specific color component image, and specifies the V-shaped display region ER1, which is the region corresponding to the V-shaped region ERv within the color image, on the basis of the V-shaped region ERv displayed in the specific color component image, thereby analyzing the state of the welding operation.

Moreover, the welding operation monitoring device 4 includes the blue component image extraction unit 34 that generates the blue component image as the specific color component image.

According to the welding operation monitoring system 1 having the above configuration, the luminance of the blue component of the plasma flow, which is visible over the V-shaped region ERv, is about twice or more higher than the luminance of the blue component on the surface of the steel sheet 6 of the welded part ER. Therefore, the portion of the plasma flow that is visible over the V-shaped region ERv, and the surface portion of the steel sheet 6 of the welded part ER can be separated from each other by extracting the blue component having a predetermined luminance or more from the color image obtained by the welded part ER imaged from the above. In this way, in the welding operation monitoring system 1, the V-shaped region ERv can be specified on the basis of the blue component image obtained by extracting the blue component having a predetermined luminance or more, and the analysis of the welding operation during the plasma shield electric resistance welding can be performed.

Additionally, in the welding operation monitoring system 1, the image capturing device 3 is disposed on the pipe outside opposite to the pipe inside of the steel sheet 6 in which the plasma flow supply device 2 is disposed, and the welded part ER where the plasma flow is visible over the V-shaped region ERv is imaged from above by the image capturing device 3. According to this configuration, the overlap of the plasma flow on the welded part ER can be suppressed, and the influence of the plasma flow can be reduced correspondingly when the analysis of the welding operation is performed on the basis of the captured color image. Additionally, regarding the equipment disposition, of the plasma flow supply device 2 and the image capturing device 3, only the image capturing device 3 is installed outside the pipe. Therefore, the equipment installation space around the steel sheet 6 can be reduced correspondingly.

Additionally, the welding operation monitoring device 4 includes the plasma flow position analysis unit 40 that extracts the red component image or the green component image or a combination thereof from the portion of the V-shaped display region ER1 of the color image, and specifies the plasma flow center region ER5 from the shading of the extracted red component image or the green component image or a combination thereof.

The plasma flow position analysis unit 40 has the plasma flow centerline calculation unit 62 that linearly approximates the pair of plasma edges e1 and e2 forming the plasma flow center region ER5, respectively, to find the V-shaped convergence angle and finds the bisector between the pair of plasma edges e1 and e2 as the plasma flow centerline L3.

Additionally, the welding operation monitoring device 4 includes the physical abutment point analysis unit 37 that detects the physical abutment point $V_1$ where the pair of abutment end portions 7a and 7b physically abut against each other on the basis of the blue component image.

Also, the plasma flow position analysis unit 40 has the comparing unit 63 that finds a relative positional relationship between the position of the plasma flow centerline L3 and the position of the physical abutment point $V_1$ obtained from the physical abutment point analysis unit 37. Suitability determination and adjustment of the plasma flow in the supply direction can be performed by the relative positional relationship.

Additionally, the welding operation monitoring device 4 includes the geometrically V-shaped convergence point analysis unit 36. The geometrically V-shaped convergence point analysis unit 36 can find the pair of approximated straight lines obtained by linearly approximating the pair of abutment end portions 7a and 7b forming the V-shaped display region ER1 and detect the intersection point between the pair of approximated straight lines as the geometrically V-shaped convergence point $V_0$.

Moreover, the welding operation monitoring device 4 includes the welding point analysis unit 38 that eliminates the image of the plasma flow specified on the basis of the blue component image from the color image, thereby generating a plasma flow eliminated image including the welding bead line and the pair of melting edge lines and finding the welding point W on the basis of the plasma flow eliminated image.

According to the welding operation monitoring system 1 having the above respective configurations, it is possible to reduce the influence of the plasma flow supplied for shielding compared to the related art to analyze the state of the welding operation while reducing the demand for the equipment installation space around the steel sheet 6.

Second Embodiment

<Configuration of Welding Operation Monitoring System of Present Embodiment>

Figure 16:
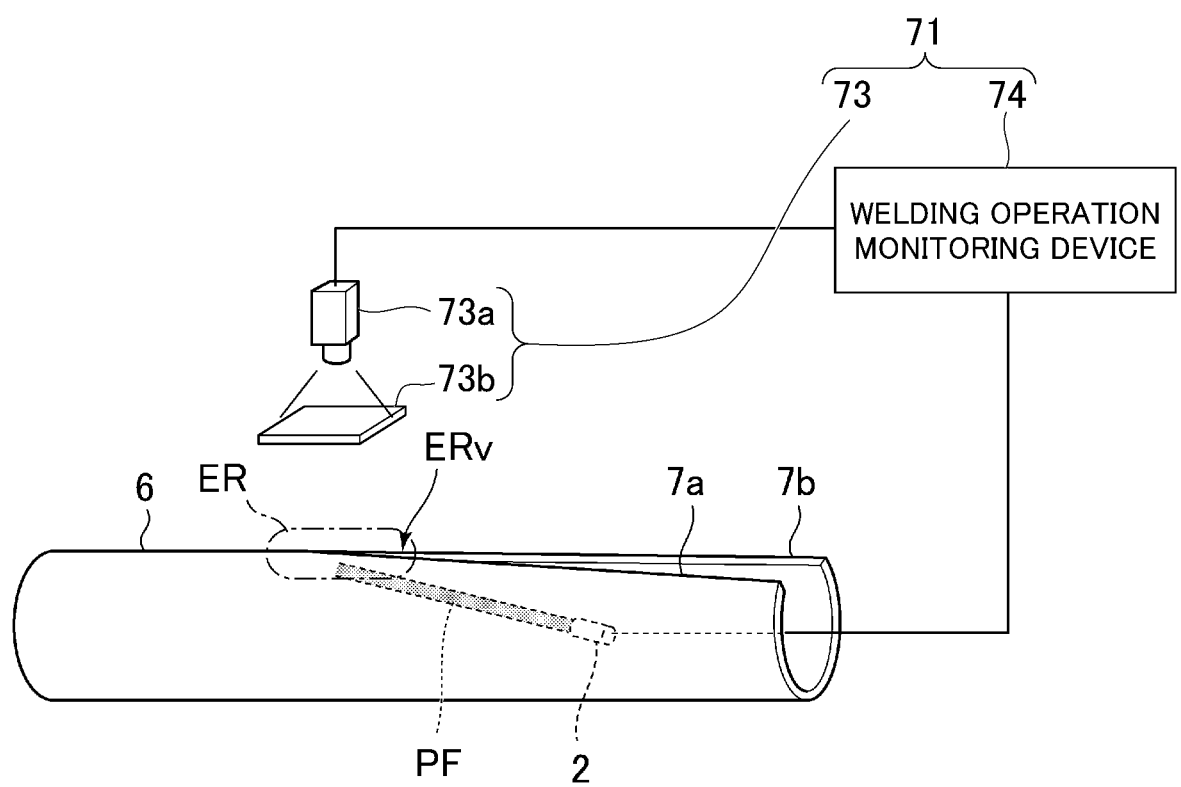
FIG. 16 is a schematic view showing the configuration of a welding operation monitoring system according to a second embodiment of the invention.

The configuration of a welding operation monitoring system 71 according to a second embodiment of the invention is shown in FIG. 16.

The welding operation monitoring system 71 includes a selected wavelength reduced image capturing device 73 and a welding operation monitoring device 74. The welding operation monitoring system 71 is particularly different from the welding operation monitoring system 1 according to the above-described first embodiment in that (1) the selected wavelength reduced image capturing device 73 includes an optical element 73b in front of lenses of an image capturing device body 73a, and (2) the welding operation monitoring device 74 generates the red component image from the color image captured by the selected wavelength reduced image capturing device 73 to perform analysis processing.

In the respective views after FIG. 16 and the following description, the same constituent elements as those of the respective constituent elements described in the above first embodiment will be designated by the same reference signs, and differences from the first above embodiment will mainly be described.

<Selected Wavelength Reduced Image Capturing Device 73>

As shown in FIG. 16, the selected wavelength reduced image capturing device 73 is disposed outside the pipe of the steel sheet 6 and above the welded part ER, and the color image obtained by imaging the welded part ER from above is input to the welding operation monitoring device 74. The optical element 73b is, for example, a band stop filter and reduces the luminance of a specific wavelength in the red component included in the plasma flow. That is, in the selected wavelength reduced image capturing device 73, the color image of the welded part ER to which only the luminance of the specific wavelength in the red component included in the plasma flow is locally reduced is generated by the optical element 73b, and this color image is input to the welding operation monitoring device 74.

Figure 17:
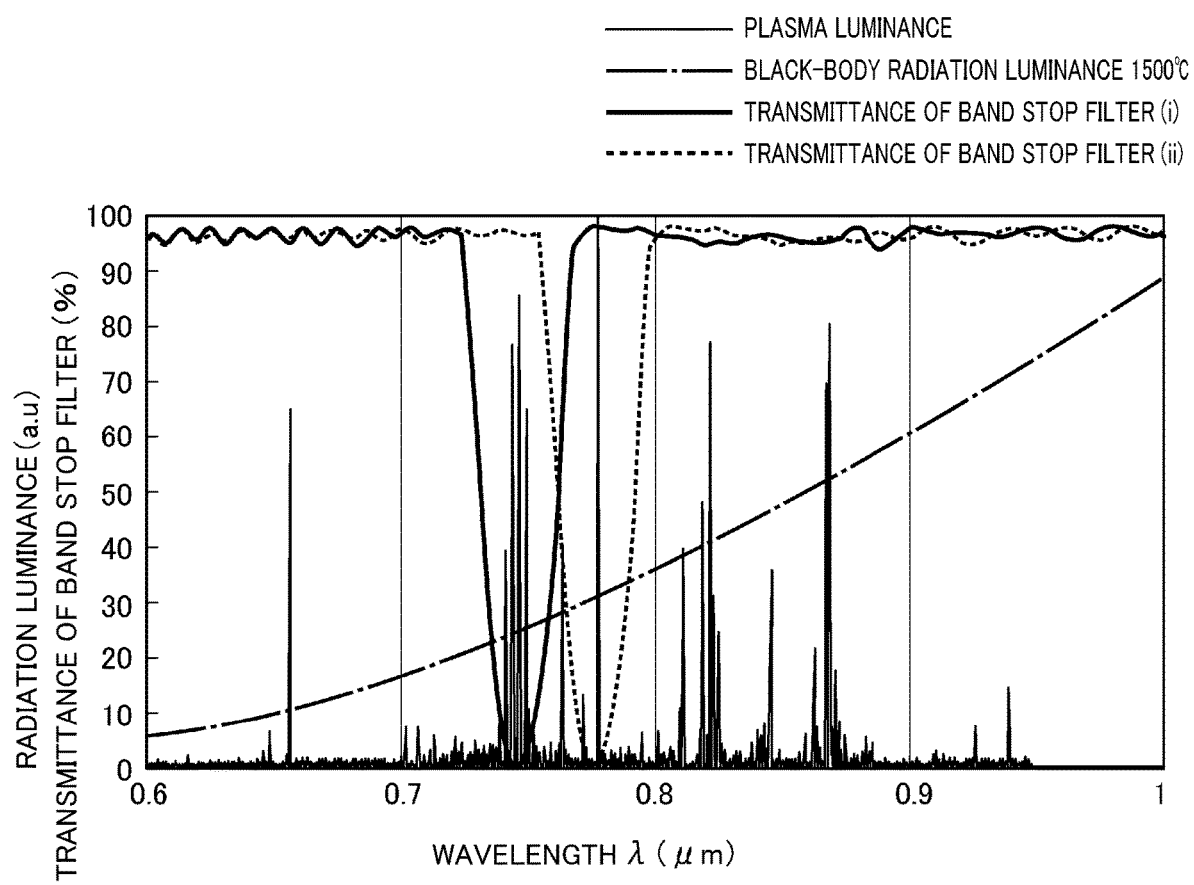
FIG. 17 is a graph showing a relationship between: the wavelength of plasma luminance and black-body radiation luminance; and the transmittance of a band stop filter.

Here, the functions of the band stop filter will be described. FIG. 17 is a graph showing a relationship among plasma luminance, the transmittance of two types of band stop filters (i) and (ii), and black-body radiation luminance. As shown in FIG. 17, the emission luminance of the plasma flow is determined depending on component gases, and a plurality of sharp peaks appear between the wavelengths of 0.6 [µm] to 1.0 [µm]. In the present embodiment, main components of the plasma flow are $N_2$ gas, Ar gas, and hydrogen gas.

The band stop filter (i) has characteristics that the band stop filter reduces the luminance of only a wavelength of, for example, 0.725 [µm] to 0.765 [µm] and transmits the light of the other wavelength. Additionally, the band stop filter (ii) has characteristics that the band stop filter reduces the luminance of only a wavelength of, for example, 0.755 [µm] to 0.795 [µm] and transmits the light of the other wavelength.

For example, in a case where the band stop filter (i) of the characteristics shown in FIG. 17 is applied as the optical element 73b, the peak (main emission luminance) of the plasma luminance, which is in a wavelength range of 0.725 [µm] to 0.765 [µm] in the red component, can be reduced. On the other hand, in a case where the band stop filter (ii) of the characteristics shown in FIG. 17 is applied as the optical element 73b, the peak (main emission luminance) of the plasma luminance, which is in a wavelength range of 0.755 [µm] to 0.795 [µm] in the red component, can be reduced. Since both the wavelengths correspond to portions having high luminances in the plasma emission of FIG. 17, the image luminance of the plasma flow portion that appears in the red component image can be significantly reduced by reducing these portions.

On the other hand, the emission of the melting edges follows the luminance distribution of black-body radiation. For example, the black-body radiation luminance at 1500 [° C.] is continuously present in a wavelength of 0.6 [µm] to 1.0 [µm], and tends to increases gently toward longer wavelengths (broken line in FIG. 17). For this reason, even though a band stop filter of which the luminance reduction range is extremely limited to a wavelength of several tens of nanometers, a reduction in luminance of the melting edge parts detected within the red component image is extremely small.

Due to such a reason, by using the band stop filters, it is possible to selectively reduce only the luminance of the portion of the red component image equivalent to the plasma flow and to expand the luminance contrast between the melting edge parts and the plasma flow portion within the red component image.

<Configuration of Welding Operation Monitoring Device 74>

Figure 18:
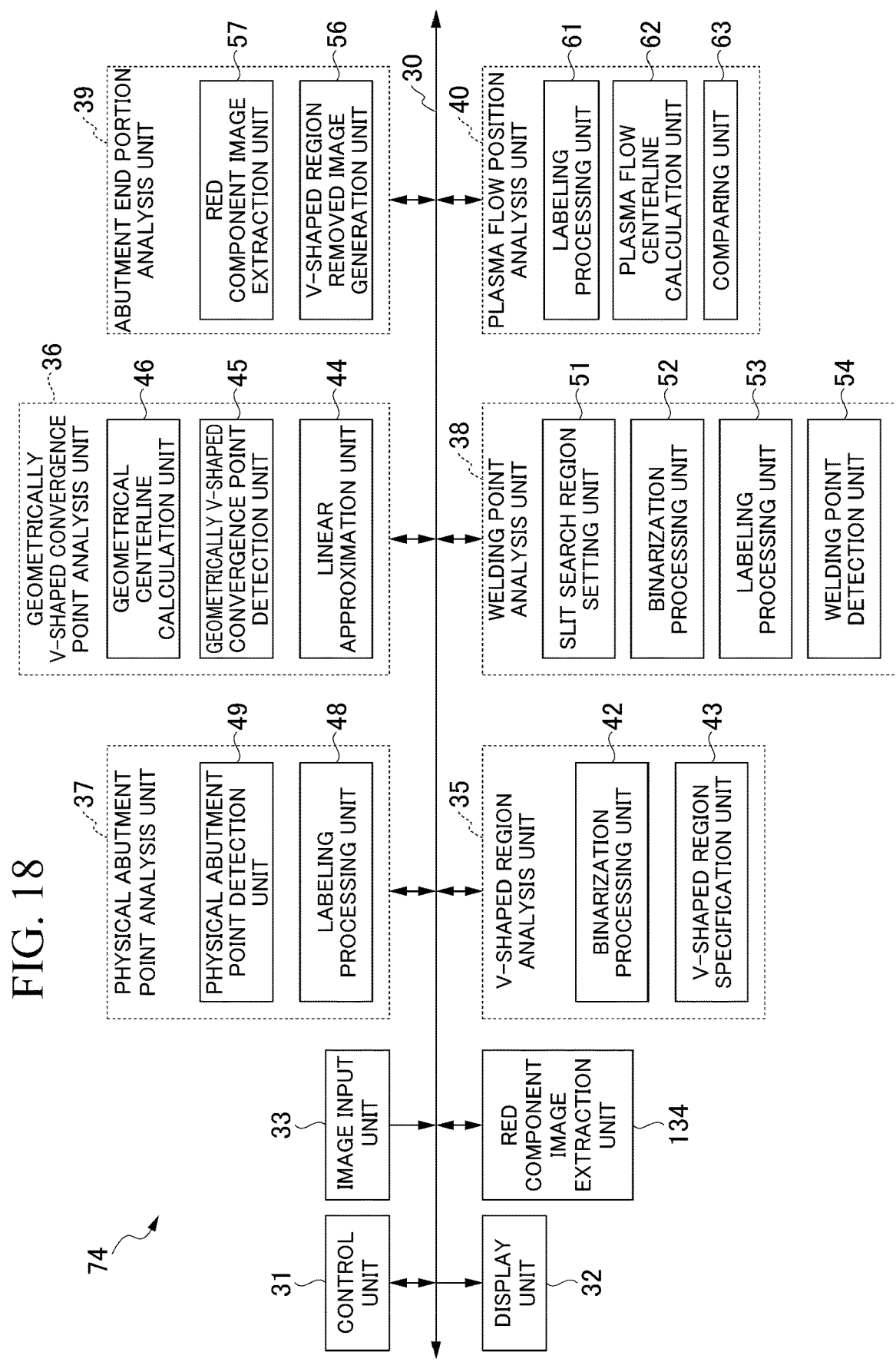
FIG. 18 is a block diagram showing a circuit configuration of a welding operation monitoring device of the embodiment.

As shown in FIG. 18, the welding operation monitoring device 74 has a configuration in which the control unit 31 constituting a microcomputer including a central processing unit (CPU), a read only memory (ROM), a random access memory (RAM), and the like that are not shown, the display unit 32, the image input unit 33, a red component image extraction unit 134, the V-shaped region analysis unit 35, the geometrically V-shaped convergence point analysis unit 36, the physical abutment point analysis unit 37, the welding point analysis unit 38, the abutment end portion analysis unit 39 and the plasma flow position analysis unit 40 are connected to each other via the bus 30.

The point that the welding operation monitoring device 74 of the present embodiment includes the red component image extraction unit 134 instead of the blue component image extraction unit 34 of the above first embodiment is one of the differences.

The image input unit 33 is connected to the selected wavelength reduced image capturing device 73, and sends the color image to the RAM of the control unit 31, red component image extraction unit 134, or the like if the color image obtained by the selected wavelength reduced image capturing device 73 is input. The red component image extraction unit 134 generates the red component image obtained by extracting the red component from the color image input from the selected wavelength reduced image capturing device 73 (refer to a red component image D7A shown in FIG. 19(A)).

Since the red component image D7A is an image generated using the color image captured via the optical element 73b, the luminance of the portion equivalent to the plasma flow is selectively reduced. On the other hand, the luminance of the portions corresponding to the melting edge parts and the welding bead parts is not reduced. Therefore, the luminance contrast between the melting edge parts and the plasma flow portion can be increased within the red component image D7A. Particularly, the luminance contrast between the melting edge parts (abutment end portions 7a and 7b) and the V-shaped plasma flow peripheral region Eb around the plasma flow center region ER5 can be increased. As a result, the binarization processing to be performed in the following step can be easily performed.

Figure 19:
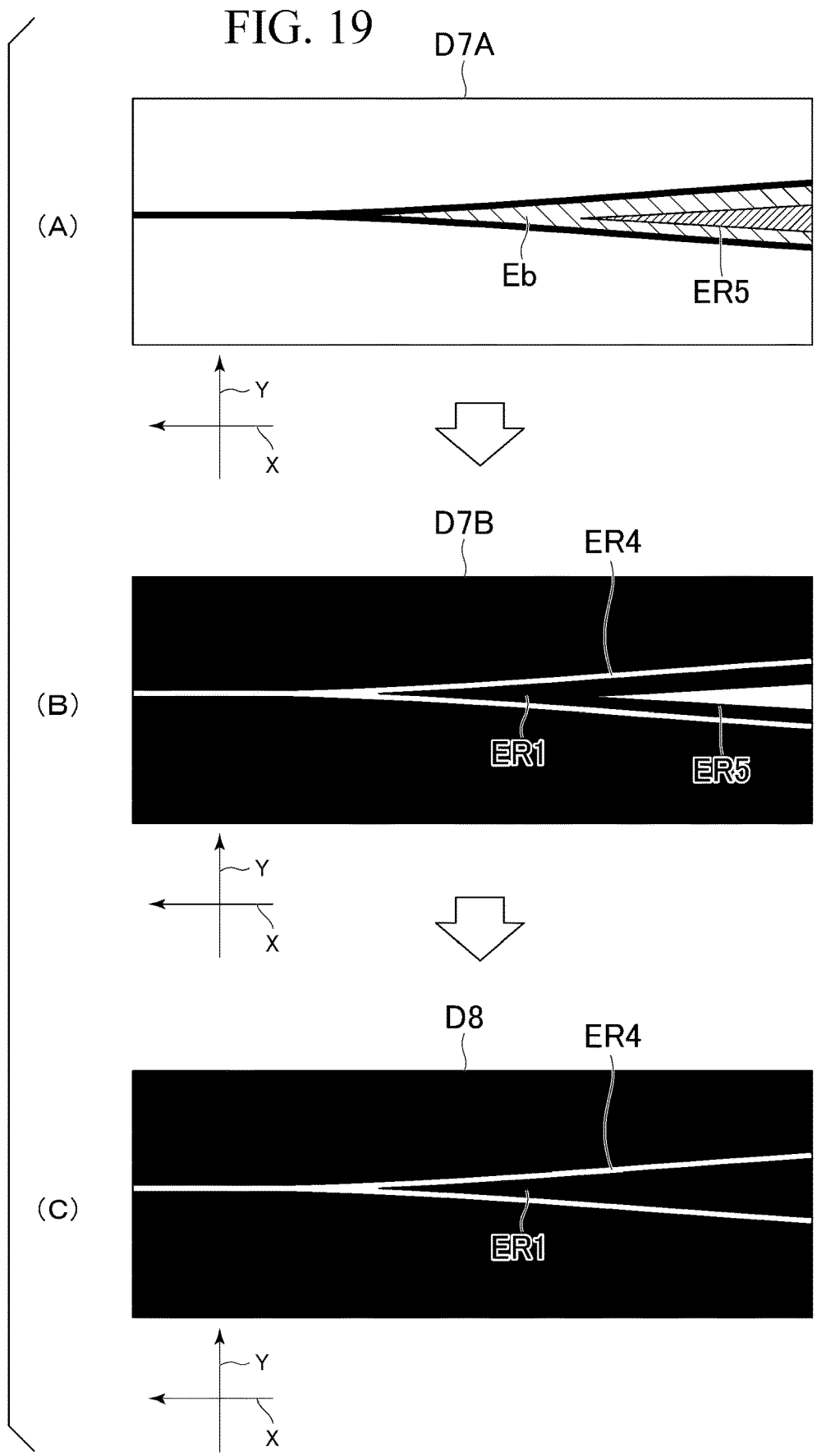

The V-shaped region analysis unit 35 performs binarization processing on the red component image D7A obtained by the red component image extraction unit 134 by the binarization processing unit 42, performs edge enhancement processing as necessary, and generates a red component binarized image D7B as shown in FIG. 19(B).

In the binarization processing, for example, pixel values "1" are given to pixels in which the luminance of received light is equal to or more than a predetermined threshold value, and pixel values "0" are given to the remaining pixels of less than the predetermined threshold value. Specifically, within the red component binarized image D7B, respective pixels indicating a melting bead line after welding, the V-shaped melting edges, and the central portion of the plasma flow, which is visible over the V-shaped region ERv, have values equal to or more than the threshold value, and have the pixel values "I". On the other hand, since the luminance of received light is less than the predetermined threshold value, the respective pixels around the central portion (plasma flow peripheral region Eb) of the plasma flow have the pixel values "0". Therefore, the plasma flow is displayed as the plasma flow center region ER5 reduced to be smaller than the V-shaped region ERv.

The V-shaped region specification unit 43 of the V-shaped region analysis unit 35, specifies the inside of two V-shaped lines as the V-shaped display region ER1 within the red component binarized image D7B generated by the binarization processing unit 42. The detection of the V-shaped display region ER1 can be performed, for example, by the following method. That is, the plasma flow center region ER5, which is in contact with a right end of the red component binarized image D7, is recognized as a lump having suitable aspect ratio range and area, and an image D8 in which the plasma flow center region ER5 is reversed with pixel values "0" is created (refer to FIG. 19(C)). In the image D8, the plasma flow center region ER5, which are the pixel values "0", and the plasma flow peripheral region Eb of the pixel values "0" therearound are integrated with each other. Therefore, the region of the pixel values "0", which is in contact with a right end of the image D5, is recognized as a lump having suitable aspect ratio range and area, and the V-shaped display region ER1 is specified.

Figure 20:
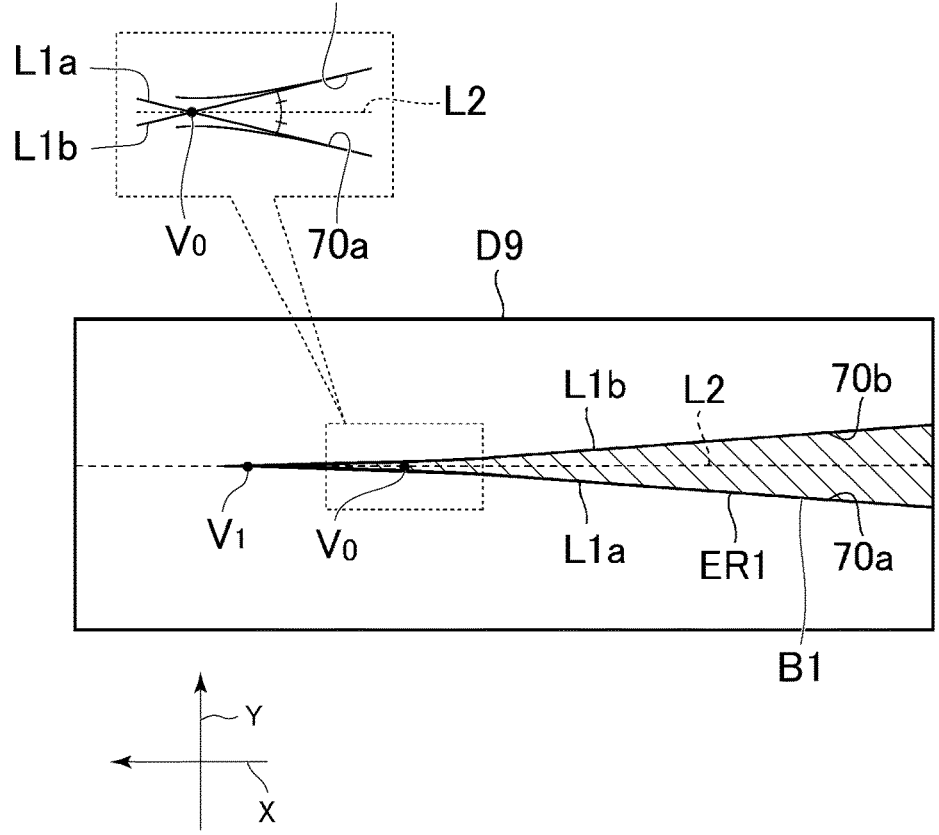
FIG. 20 is a schematic view showing detecting the V-shaped display region, the geometrically V-shaped convergence point, the geometrical centerline, and the physical abutment point.

The geometrically V-shaped convergence point analysis unit 36 linearly approximates both the edge lines, converged in a V-shape, of the V-shaped display region ER1 specified by the V-shaped region analysis unit 35, respectively, using the linear approximation unit 44. Here, both the edge lines, converged in a V-shape, of the V-shaped display region ER1, are equivalent to the abutment end portions 7a and 7b of the V-shaped region ERv in the steel sheet 6. For that reason, as shown in the image D9 of FIG. 20, the approximated straight lines L1a and L1b of both the steel pipe edges 70a and 70b of the V-shaped display region ER1 can be regarded as approximated straight lines of the abutment end portions 7a and 7b (FIG. 5(A) to FIG. 6(B)) of the V-shaped region ERv in the steel sheet 6. In addition, although FIG. 20 is equivalent to the image D8 of FIG. 19(C), the image D9 in which the light and darkness of FIG. 19(C) are reversed is shown for the purpose of description.

The geometrically V-shaped convergence point analysis unit 36 detects the intersection point between the approximated straight lines L1a and L1b as the geometrically V-shaped convergence point $V_0$ (FIG. 20), using the geometrically V-shaped convergence point detection unit 45.

As described above, the geometrically V-shaped convergence point analysis unit 36 finds the pair of approximated straight lines L1a and L1b obtained by linearly approximating the pair of abutment end portions 7a and 7b forming the V-shaped display region ER1. Also, the geometrically V-shaped convergence point analysis unit 36 detects the intersection point between the pair of approximated straight lines L1a and L1b as the geometrically V-shaped convergence point $V_0$.

Moreover, the geometrically V-shaped convergence point analysis unit 36 calculates a bisector of an angle (V-shaped convergence angle) formed by the approximated straight lines L1a and L1b found from the red component binarized image D9, and the geometrically V-shaped convergence point $V_0$ as the geometrical centerline L2 (broken line of FIG. 20), using the geometrical centerline calculation unit 46.

The physical abutment point analysis unit 37 performs the labeling processing of allocating a label to each blob on the V-shaped display region ER1 specified by the V-shaped region specification unit 43 as described above, using the labeling processing unit 48, similarly to the above first embodiment.

The physical abutment point analysis unit 37 extracts a blob satisfying predetermined conditions as the blob B1 (a hatched portion of FIG. 20) indicating the V-shaped region ERv formed by the abutment end portions 7a and 76 of the steel sheet 6 from the inside of the labeling-processed image, using the physical abutment point detection unit 49.

Conditions for determining that the blob B1 indicates the V-shaped region ERv are, for example, conditions that the blob is not in contact with a left end of the binarized image D9 shown in FIG. 20 and in contact with only a right end of the binarized image D9, the area is equal to or more than 50 [mm$^2$], and a value (aspect ratio) obtained by dividing the longitudinal (the Y direction orthogonal to the conveyance direction X) length of the blob B1 by the lateral length (conveyance direction X) of the blob B1 is equal to or less than 0.2. If the blob B1 indicating the V-shaped region ERv is extracted on the basis of the conditions, the physical abutment point analysis unit 37 detects a most downstream point of the blob B1 as the physical abutment point $V_1$. That is, the physical abutment point detection unit 49 of the physical abutment point analysis unit 37 finds the physical abutment point $V_1$ where the pair of abutment end portions 7a and 7b physically abut against each other, on the basis of the red component binarized image D9.

The V-shaped region removed image generation unit 56 of the abutment end portion analysis unit 39 generates a V-shaped region removed color image obtained by removing an image portion of the V-shaped display region ER1 specified by the V-shaped region analysis unit 35 from the color image input from the selected wavelength reduced image capturing device 73. The red component image extraction unit 57 of the abutment end portion analysis unit 39 extracts the red component from the V-shaped region removed color image to generate V-shaped region removed analysis image D3 (since this is the same as that of FIG. 11(A) of the above first embodiment, FIG. 11(A) is referred to. The same applies below).

As shown in FIG. 11(A), a V-shaped removal region ER2 from which the image portion of the V-shaped display region ER1 (FIG. 20)) is removed is shown in the V-shaped region removed analysis image D3 formed of the red component, and the state of a welding bead part 70 and the like appearing the surface of the welded part ER of the steel sheet 6 is displayed in the shading of the red component in the other region.

The welding point analysis unit 38 sets a slit search region ER3 within the V-shaped region removed analysis image D3 of the red component, using a slit search region setting unit 51 (refer to FIG. 11(B)). Here, in a case where the abutment end portions 7a and 7b of the steel sheet 6 are butted against each other and one portion, which is linearly observed, is a weld line, it is assumed that the weld line is located on the geometrical centerline L2 that is the bisector of the V-shaped convergence angle obtained by the geometrically V-shaped convergence point analysis unit 36. In the case of the present embodiment, the slit search region setting unit 51 sets a rectangular region, through which the geometrical centerline L2 runs in a longitudinal direction thereof, to the slit search region ER3.

Specifically, in the longitudinal direction that extends in the conveyance direction X in the slit search region ER3, the physical abutment point $V_1$ detected by the physical abutment point analysis unit 37 is defined as upstream end of the slit search region ER3, and a downstream end of the V-shaped region removed analysis image D3 is defined as a downstream end $V_E$, of the slit search region ER3 (refer to FIG. 11(B)). Additionally, it is desirable to have a region having a predetermined width (for example, 2 [mm]) around the geometrical centerline L2 in the Y direction orthogonal to the longitudinal direction of the slit search region ER3.

The welding point analysis unit 38 performs the binarization processing of the V-shaped region removed analysis image D3, in which the slit search region ER3 is set, using the binarization processing unit 52, and then, performs the labeling processing of allocating a label to each blob on the binarized V-shaped region removed analysis image D3, using a labeling processing unit 53.

The welding point analysis unit 38 calculates the aspect ratio of each labeling-processed blob, using the welding point detection unit 54. As shown in FIG. 11(C), the welding point analysis unit 38 detects the most downstream point of a blob B2, which is present on the most downstream side in the conveyance direction X of the steel sheet 6 among respective blobs having an aspect ratio of less than 1/2 in the slit search region ER3 within the binarized V-shaped region removed analysis image D4, as the welding point W.

In a case where no blob having an aspect ratio of less than 1/2 is not present within the V-shaped region removed analysis image D4, the welding point detection unit 54 connects respective blobs on the geometrical centerline L2 to each other, and then, detects the most downstream point of the connected blob in the conveyance direction X of the steel sheet 6 as the welding point W.

In this way, by detecting the welding point W on the basis of the aspect ratio of the blobs, the welding point detection unit 54 can detect the welding point W except for the blob 133 resulting from noise for example, even in a case where a blob B3 resulting from noise is within the slit search region ER3 (refer to FIG. 11(C)).

As described above, the welding point analysis unit 38 finds the welding point W on the basis of the plasma flow eliminated image including the V-shaped removal region ER2 that is eliminated by reversing the image of the plasma flow portion in the color image and is surrounded by the welding bead line and the melting edge lines.

The plasma flow position analysis unit 40 performs the labeling processing of allocating a label to each blob on the binarized image D7B, using the labeling processing unit 61, and extracts a blob satisfying the predetermined conditions as a blob of the plasma flow center region ER5. In addition, conditions for determining a blob as the blob of the plasma flow center region ER5 are, for example, conditions that the blob is not in contact with a left end of the binarized image D7B and in contact with only a right end of the binarized image D7B, the area is equal to or more than 20 [mm$^2$], and a value (aspect ratio) obtained by dividing the longitudinal (the Y direction orthogonal to the conveyance direction X) length of the blob by the lateral length (conveyance direction X) of the blob is equal to or less than 0.2.

Figure 21:
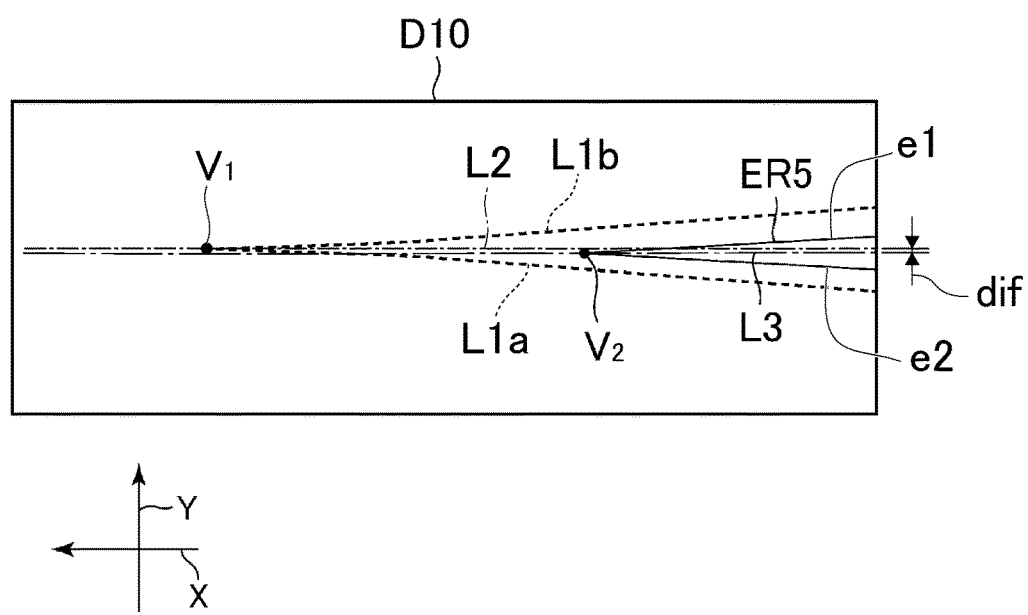
FIG. 21 is a schematic view showing calculating the plasma flow centerline.

The plasma flow centerline calculation unit 62 of the plasma flow position analysis unit 40 calculates a plasma flow centerline L3 that is a centerline in a longitudinal direction of the plasma flow center region ER5 and which extends toward the conveyance direction X side, as shown in the image D10 of FIG. 21. In addition, in the synthetic image D10 of FIG. 21, for the purpose of description, adjustments are made such that the light and darkness of the binarized image D7B shown in FIG. 19(B) are reversed or respective lines are shown by broken lines.

As the method of calculating such a plasma flow centerline L3, for example, when the blob of the plasma flow center region ER5 within the image D10 has a V-shaped convergence shape, an intersection point between approximated straight lines obtained linearly approximating both plasma edges e1 and e2 that are converged in a V-shape is detected as a plasma flow center tip point V2. Next, the plasma flow centerline calculation unit 62 calculates a bisector of an angle (plasma flow V-shaped convergence angle) formed by the pair of plasma edges e1 and e2 linearly approximated by the binarized image D10, and the plasma flow center tip point V2 as the plasma flow centerline L3.

The comparing unit 63 of the plasma flow position analysis unit 40 compares the physical abutment point $V_1$ obtained by the physical abutment point detection unit 49 with the plasma flow centerline L3 calculated by the plasma flow centerline calculation unit 62, and determines whether or not the plasma flow centerline L3 deviates from the physical abutment point Vt. In addition, a form in which the geometrical centerline L2 is used as a comparison target of the plasma flow centerline L3 instead of the physical abutment point $V_1$ can be also considered. In this case, as long as the plasma flow centerline L3 and the geometrical centerline L2 have a relationship in which the centerlines are parallel to each other, the amount of positional deviation can be known with a relative positional deviation between the plasma flow centerline L3 and the geometrically V-shaped convergence point $V_0$.

In a case where the relative positions of the physical abutment point $V_1$ and the plasma flow centerline L3 coincide with each other (dif=0 of FIG. 21), the comparing unit 63 determines that the plasma flow center region ER5 is located along the center of the V-shaped region ERv in the welded part ER of the steel sheet 6 and the plasma flow is supplied to the optimal position of the welded part ER from an optimal direction. On the other hand, in a case where the position or direction of the plasma flow centerline L3 deviates relative to the physical abutment point $V_1$ (in a case where dif of FIG. 21 is not 0), the comparing unit 63 determines that the plasma flow center region ER5 deviates from the center of the V-shaped region ERv in the welded part ER of the steel sheet 6 and the plasma flow is not supplied to the welded part ER from optimal position and direction.

As described above, the plasma flow position analysis unit 40 has the plasma flow centerline calculation unit 62 that finds the plasma flow centerline L3 of the plasma flow from the image of the separated plasma flow, and the comparing unit 63 that finds the relative positions between the plasma flow centerline L3 and the physical abutment point $V_1$.

The welding operation monitoring device 74 can allows the display unit 32 to display detection results of the geometrically V-shaped convergence point $V_0$, the physical abutment point $V_1$, and the welding point W, and a determination result of whether or not the plasma flow centerline L3 deviates from the physical abutment point $V_1$, and allow the operator to analyze the welding operation. In addition, similarly to the above first embodiment, the plasma flow supply device 2 can correct the plasma flow supply angle θ and the plasma flow supply position of the plasma flow supply machine 14, on the basis of the position correction data received from the welding operation monitoring device 74, and supply the plasma flow from a position and a direction that are optimal for the welded part ER.

Figure 22:
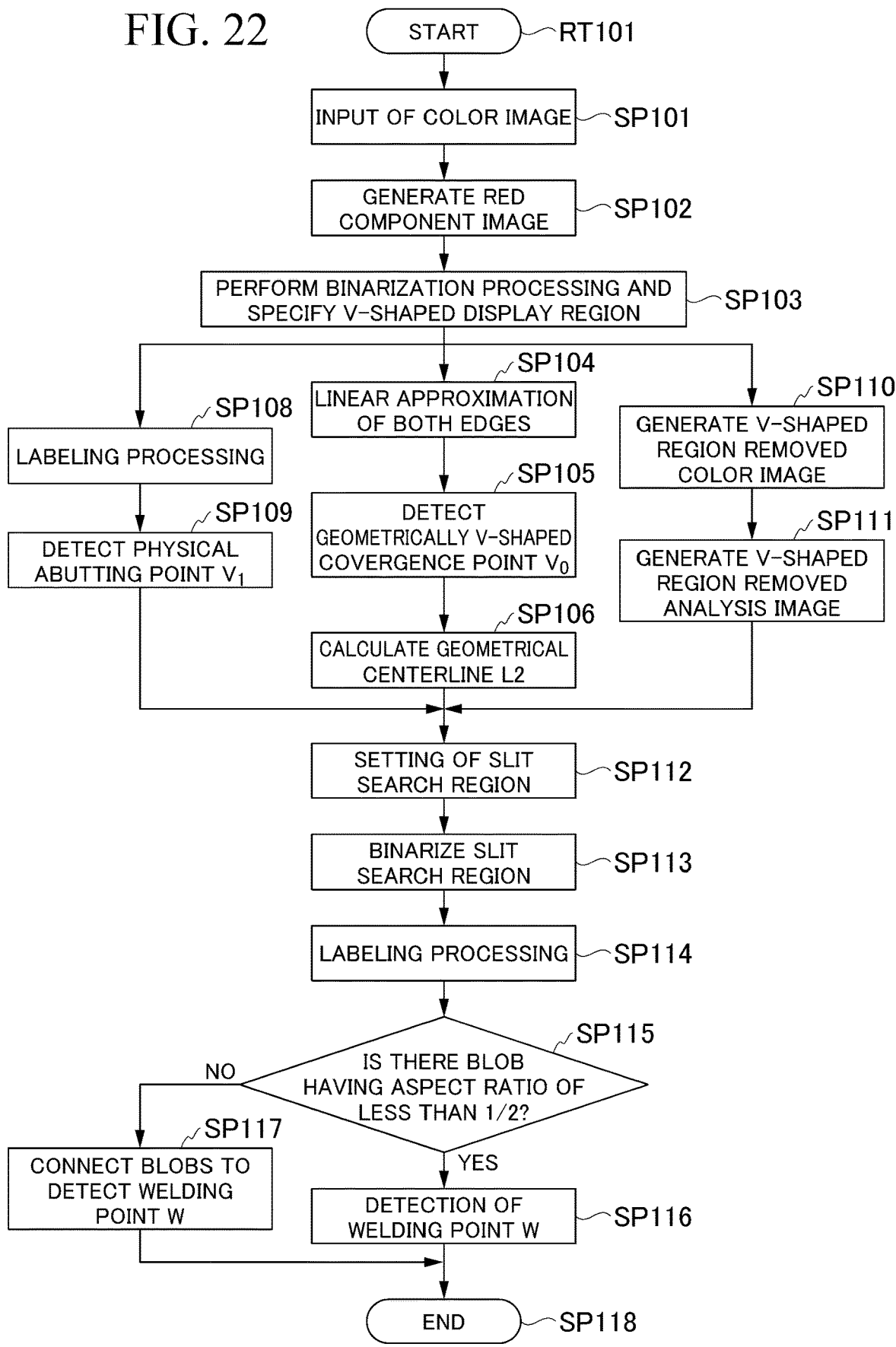
FIG. 22 is a flowchart showing a welding operation analysis processing procedure using the welding operation monitoring device.

The welding operation analysis processing using the welding operation monitoring system 71 having the configuration described above will be described below with reference to the flowchart of FIG. 22. In the welding operation analysis processing, the analysis processing of finding the geometrically V-shaped convergence point $V_0$, the geometrical centerline L2, the physical abutment point $V_1$, the V-shaped region removed analysis image, and the welding point W is performed.

Moreover, the plasma flow position analysis processing using the welding operation monitoring system 71 will also be described below with reference to the flowchart of FIG. 23. In the plasma flow position analysis processing, the analysis processing of finding the positional deviation of the plasma flow centerline L3 with respect to the physical abutment point $V_1$ is performed.

<Welding Operation Analysis Processing>

First, the welding operation analysis processing using the flowchart shown in FIG. 22 will be described. As shown in FIG. 22, if the welding operation monitoring device 74 enters from the start step of a routine RT101 and proceeds to Step SP101 and a color image (an image of which the luminance of the specific wavelength in the red component is reduced) is input from the selected wavelength reduced image capturing device 73, the process proceeds to the next Step SP102. In Step SP102, the welding operation monitoring device 74 extracts the red component from the color image input in Step SP101 to generate a red component image, and proceeds to the next Step SP103.

Step SP103 to Step SP106 are the processing steps of calculating the geometrical centerline L2, and Step SP108 to Step SP109 are the processing steps of calculating the physical abutment point $V_1$. In Step SP103, the welding operation monitoring device 74 performs the binarization processing of the red component image, performs the edge enhancement processing as necessary, specifies the pixel region indicating the V-shaped region ERv as the V-shaped display region ER1 within the red component image, and proceeds to the next Step SP104, Step SP108 and Step SP10. In Step SP104, the welding operation monitoring device 74 linearly approximates both the edge lines, converged in a V-shape, of the V-shaped display region ER1, and proceeds to the next Step SP105.

In Step SP105, the welding operation monitoring device 74 detects the intersection point between the pair of approximated straight line L1a and L1b found in Step SP104 as the geometrically V-shaped convergence point $V_0$, and proceeds to the next Step SP106. In Step SP106, the welding operation monitoring device 74 calculates the bisector of the angle (V-shaped convergence angle) formed by the approximated straight lines L1a and L1b found in Step SP104 and the geometrically V-shaped convergence point $V_0$ detected in Step SP105 as the geometrical centerline L2 and proceeds to the next Step SP112.

On the other hand, in Step SP110, the welding operation monitoring device 74 removes the portion of the V-shaped display region ER1 obtained in Step SP103 from the color image obtained from the selected wavelength reduced image capturing device 73 in Step SP101 to generate the V-shaped region removed color image, and proceeds to the next Step SP111. In Step SP111, the welding operation monitoring device 74 extracts the red component from the V-shaped region removed color image to generate the V-shaped region removed analysis image D3 in which the state of the welding bead part 70 or the like in the welded part surface of the steel sheet 6 is displayed in the shading of the red component, and proceeds to the next Step SP112.

Additionally, in Step SP108, the welding operation monitoring device 74 performs the labeling processing of allocating a label to each blob on the red component binarized image obtained in Step SP103, and proceeds to the next Step SP109. In Step SP109, the welding operation monitoring device 74 extracts the blob satisfying the predetermined conditions from the blobs obtained by the labeling processing as the blob B1 indicating the V-shaped region ERv formed by the abutment end portions 7a and 7b of the steel sheet 6, detects the most downstream point of the blob B1 as the physical abutment point $V_1$, and proceeds to the next Step SP12.

In Step SP112, the welding operation monitoring device 74 sets the slit search region ER3 within the V-shaped region removed analysis image D3 obtained in Step SP111, and proceeds to the next Step SP113. In Step SP113, the welding operation monitoring device 74 performs the binarization processing of the V-shaped region removed analysis image D3 in which the slit search region ER3 is set, performs the labeling processing of allocating a label to each blob on the binarized V-shaped region removed analysis image D4 in the next Step SP114, and proceeds to the next Step SP115.

In Step SP115, the welding operation monitoring device 74 calculates the aspect ratio of each labeling-processed blob, and determines whether or not there is a blob having an aspect ratio of less than 1/2 within the slit search region ER3. If a positive result (SP115: YES) is obtained in Step SP115, this means that there is a blob having an aspect ratio of less than 1/2 within the slit search region ER3. In this case, the welding operation monitoring device 74 proceeds to the next Step SP116. In Step SP116, the welding operation monitoring device 74 detects the most downstream point of the blob B2, which is present on the most downstream side in the conveyance direction X of the steel sheet 6 among the blobs B2 having an aspect ratio of less than 1/2 within the slit search region ER3, as the welding point W, and proceeds to the next Step SP118 to end the above-described welding operation analysis processing procedure.

On the other hand, if a negative result (SP115: NO) is obtained in Step SP115, this means that there is no blob having an aspect ratio of less than 1/2 within the slit search region ER3. In this case, the welding operation monitoring device 74 proceeds to the next Step SP117. In Step SP117, the welding operation monitoring device 74 connects blobs on the geometrical centerline L2 to each other, then detects the most downstream point of the connected blob in the conveyance direction X of the steel sheet 6 as the welding point W, and proceeds to the next Step SP118 to end the above-described welding operation analysis processing procedure. As described above, in the present embodiment, the luminance of the specific wavelength in the red component of the color image is selectively reduced when capturing is performed in the image capturing step. Additionally, in the welding operation monitoring step, the state of the welding operation is analyzed on the basis of the color image in which the luminance of the specific wavelength in the red component is selectively reduced.

<Plasma Flow Position Analysis Processing>

Next, the plasma flow position analysis processing procedure using the flowchart shown in FIG. 23 will be described. As shown in FIG. 23, the welding operation monitoring device 74 enters from a start step of a routine RT102, and according to the above-described Step SP101 to Step SP103, extracts the red component from the color image input from the selected wavelength reduced image capturing device 73, then performs the binarization processing of the obtained red component image, performs the edge enhancement processing as necessary, and specifies the pixel region indicating the V-shaped region ERv as the V-shaped display region ER1, and proceeds to the following Step SP126.

Additionally, in Step SP126, the welding operation monitoring device 74 performs the labeling processing of allocating a label to each blob on the red component binarized image D7B (refer to FIG. 19(B)) obtained in Step SP103, and proceeds to the next Step SP127.

In Step SP127, the welding operation monitoring device 74 extracts a blob satisfying the predetermined conditions as the blob of the plasma flow center region ER5, then calculates and finds the plasma flow centerline L3 on the basis of this blob, and proceeds to the following Step SP128. In Step SP127, for example, the bisector of the plasma flow V-shaped convergence angle is calculated as the plasma flow centerline L3 from the approximated straight lines obtained by linearly approximating both the plasma flow edges e1 and e2 of the blob of plasma flow center region ER5 that are converged in a V-shape, respectively, and the plasma flow center tip point V2 that is the intersection point between the approximated straight lines.

In Step SP128, the welding operation monitoring device 74 compares the physical abutment point $V_1$ obtained in the above-described Step SP109 with the plasma flow centerline L3 calculated in Step SP127. Then, after whether or not the plasma flow centerline L3 deviates from the physical abutment point $V_1$ is determined and the determination result is obtained, the process proceeds to the next Step SP129 where the plasma flow position analysis processing procedure is ended.

Summary of Second Embodiment

The main points of the welding operation monitoring system 71 of the present embodiment are summarized below.

In the welding operation monitoring system 71 of the present embodiment, the selected wavelength reduced image capturing device 73 is provided with the optical element 73b that selectively reduces a luminance corresponding to the specific wavelength in the red component of the plasma flow. Also, the welding operation monitoring device 74 analyzes the state of the welding operation, using the red component image extracted as a specific color component image from the color image captured via the optical element 73b. Moreover, the welding operation monitoring device 74 performs the binarization processing of the red component image to separate the image of the plasma flow from the image of the V-shaped display region ER1.

That is, the welding operation monitoring device 74 of the present embodiment generates the V-shaped region removed color image obtained by removing the image portion of the V-shaped display region ER1 specified by the V-shaped region analysis unit 35 from the color image input from the selected wavelength reduced image capturing device 73, using the abutment end portion analysis unit 39. Also, the welding operation monitoring device extracts the red component from the V-shaped region removed color image to generate the V-shaped region removed analysis image (analysis image) D3 as shown in FIG. 11(A).

In this case, the welding operation monitoring device 74 generates the V-shaped region removed analysis image D3 on the basis of the color image in which the plasma luminance of the specific wavelength component in the red component is selectively reduced by the selected wavelength reduced image capturing device 73. Hence, the V-shaped region removed analysis image D3 in which the influence of the luminance of the plasma flow on the surface of the steel sheet 6 in the welded part ER is reduced can be generated. In this way, in the welding operation monitoring device 74, the influence resulting from the plasma flow can be reduced. Thus, the analysis or the like of a characteristic shape, which occurs in the welded part ER and has the two-stage V-shaped convergence angle, can also be more accurately performed.

Also in the welding operation monitoring system 71 according to the configuration described above, the selected wavelength reduced image capturing device 73 is disposed on the pipe outside opposite to the pipe inside of the steel sheet 6 in which the plasma flow supply device 2 is disposed, and the welded part ER where the plasma flow is visible over the V-shaped region ERv is captured from above by the selected wavelength reduced image capturing device 73. According to this configuration, the overlap of the plasma flow on the welded part ER can be suppressed, and the influence of the plasma flow can be reduced correspondingly when the analysis of the welding operation is performed on the basis of the captured color image. Moreover, in the welding operation monitoring system 71, since only the selected wavelength reduced image capturing device 73 of the plasma flow supply device 2 and the selected wavelength reduced image capturing device 73 may be installed outside the pipe of the steel sheet 6. Therefore, the equipment installation space around the steel sheet 6 can be reduced correspondingly.

In the welding operation monitoring system 71, in a case where the band stop filter (i) that reduces only a wavelength of about 0.725 [µm] to 0.765 [µm] was provided as the optical element 73b in the selected wavelength reduced image capturing device 73, it was confirmed that the luminance of the black-body radiation is reduced only by about 3%, and the luminance of the plasma flow can be reduced by 18% while reducing the influence on the entire luminance.

Additionally, in the welding operation monitoring system 71, even in a case where the band stop filter (ii) that reduces only a wavelength of about 0.755 [µm] to 0.795 [µm] is provided as the optical element 73b in the selected wavelength reduced image capturing device 73, it was similarly confirmed that the luminance of the black-body radiation is reduced only by about 3%, and the luminance of the plasma flow can be reduced by 22% while reducing the influence on the entire luminance.

Moreover, in the welding operation monitoring system 71, even in a case where both the band stop filters (i) and (ii) are provided as the optical element 73b in the selected wavelength reduced image capturing device 73, it was similarly confirmed that the luminance of the black-body radiation is reduced only by about 3%, and the luminance of the plasma flow can be reduced by 38% while reducing the influence on the entire luminance. In this way, in the welding operation monitoring system 71 according to the second embodiment, by providing the selected wavelength reduced image capturing device 73 including the optical element 73b that reduces luminance only in a predetermined wavelength, it is possible to distinguish between the melting edge parts and the plasma flow in the image of the welded part ER and determine the geometrically V-shaped convergence point $V_0$, the physical abutment point $V_1$, the geometrical centerline L2 of the V-shaped display region, and the plasma flow centerline L3. Moreover, when the analysis of the welding operation is performed on the basis of the color image obtained in the selected wavelength reduced image capturing device 73, the influence of the plasma flow can be reduced.

Additionally, a small amount of the plasma flow leaks from the V-shaped region ERv to the pipe outside. However, the second Embodiment is also useful as a countermeasure against the noise caused by the leaked plasma flow.

Moreover, the welding operation monitoring system 71 of the present embodiment also includes the following configurations.

That is, the welding operation monitoring device 74 includes the plasma flow position analysis unit 40 that specifies the plasma flow center region ER5 of the plasma flow on the basis of the binarized red component image.

The plasma flow position analysis unit 40 has the plasma flow centerline calculation unit 62 that finds the bisector between the pair of plasma edges e1 and e2 as the plasma flow centerline 13 on the basis of the V-shaped convergence angle obtained by linearly approximating the pair of plasma edges e1 and e2 forming the plasma flow center region ER5, respectively.

The welding operation monitoring device 74 includes the physical abutment point analysis unit 37 that detects the physical abutment point $V_1$ where the pair of abutment end portions 7a and 7b physically abuts against each other on the basis of the binarized red component image.

Also, the plasma flow position analysis unit 40 has the comparing unit 63 that finds a relative positional relationship between the position of the plasma flow centerline L3 and the position of the physical abutment point $V_1$ obtained from the physical abutment point analysis unit 37.

The welding operation monitoring device 74 includes the geometrically V-shaped convergence point analysis unit 36 that finds the pair approximated straight lines L1a and L1b obtained by linearly approximating the pair of melting edge lines on the basis of the binarized red component image and finds the intersection point between the pair of approximated straight line L1a and L1b as the geometrically V-shaped convergence point $V_0$. Moreover, the welding operation monitoring device 74 includes the welding point analysis unit 38 that eliminates the image of the plasma flow specified on the basis of the binarized red component image from the color image, thereby generating a plasma flow eliminated image including the welding bead line and the pair of melting edge lines and finding the welding point W on the basis of the plasma flow eliminated image.

Other Embodiments

In the above-described first and second embodiments, a case has been described in which the plasma flow supply device 2, which supplies the plasma flow from below the welded part ER, is provided inside the pipe of the steel sheet 6 formed in a tubular shape, while the image capturing device 3 (or the selected wavelength reduced image capturing device 73), which captures, from above, the welded part ER in which the plasma flow is visible over the V-shaped region ERv, is provided outside the pipe opposite to the pipe inside of the steel sheet 6 in which the plasma flow supply device 2 is disposed. However, the invention is not limited only to this configuration, and the plasma flow supply device 2, which supplies the plasma flow from above the welded part ER, may be provided outside the pipe of the steel sheet 6 formed in a tubular shape, while the image capturing device 3 (or the selected wavelength reduced image capturing device 73), which captures, from below, the welded part ER in which the plasma flow is visible over the V-shaped region ERv, may be provided inside the pipe opposite to the pipe outside of the steel sheet 6 in which the plasma flow supply device 2 is disposed.

Additionally, in the above-described first embodiment as shown in FIG. 9, a case has been described in which the abutment end portion analysis unit 39 of the welding operation monitoring device 74 is provided with the red component image extraction unit 57 that extracts the red component from the V-shaped region removed color image to generates the V-shaped region removed analysis image D3. However, the invention is not limited only to this configuration, and a specific color component image extraction unit, that extracts a specific color of the red component or the green component or a combination thereof to generate the V-shaped region removed analysis image from the V-shaped region removed color image, may be provided in the abutment end portion analysis unit 39. In this case, in a case where the green component is extracted, a green component in which the wavelength is more than 450 [nm] to 650 [nm] and more preferably 510 [nm] to 560 [nm] that do not overlap the blue component and the red component is desirable.

Additionally, in the above-described first embodiment, as shown in FIG. 9, a case has been described in which the plasma flow position analysis unit 40 of the welding operation monitoring device 74 is provided with the V-shaped region extraction unit 59 that extracts only the red component in the V-shaped display region ER1 (FIG. 10(A)) portion specified in the V-shaped region analysis unit 35 from the color image input from the image capturing device 3, to generate the intra-V-shaped-region analysis image. However, the invention is not limited only to this configuration, and the V-shaped region extraction unit 59, which extracts the red component or the green component or a combination thereof in the V-shaped display region ER1 (FIG. 10(A)) portion specified by the V-shaped region analysis unit 35 from the color image input from the image capturing device 3, to generate the intra-V-shaped-region analysis image, may be provided in the plasma flow position analysis unit 40. In this case, in a case where the green component is extracted, a green component in which the wavelength is more than 450 [nm] to 650 [nm] and more preferably 510 [nm] to 560 [nm] that do not overlap the blue component and the red component is desirable.

INDUSTRIAL APPLICABILITY

According to the present invention, it is possible to provide the welding operation monitoring system and the welding operation monitoring method capable of reducing the influence of the plasma flow compared to the related art to analyze the state of the welding operation while reducing the demand for the installation space of equipment around the steel sheet. Therefore, the industrial applicability is broad.

BRIEF DESCRIPTION OF THE REFERENCE SYMBOLS 1, 71: welding operation monitoring system
3: image capturing device
4, 74: welding operation monitoring device
6: steel sheet (strip-shaped steel sheet)
7a, 7b: abutment end portion
34: blue component image extraction unit
36: geometrically V-shaped convergence point analysis unit
37: physical abutment point analysis unit
38: welding point analysis unit
40: plasma flow position analysis unit
42: binarization processing unit
62: plasma flow centerline calculation unit
63: comparing unit
73: selected wavelength reduced image capturing device (image capturing device)
73b: optical element
134: red component image extraction unit
ER1: V-shaped display region
ER5: plasma flow center region
ERv: V-shaped region
L1a, L1b: approximated straight line
L2: geometrical centerline
L3: plasma flow centerline
$V_0$: geometrically V-shaped convergence point
$V_1$: physical abutment point
W: welding point

The invention claimed is:

1. A welding operation monitoring system that is configured to monitor a welding operation when a pair of abutment end portions is converged in a V-shape while a strip-shaped steel sheet is formed in a tubular shape and electric resistance welding is performed while supplying a plasma flow to a welded part including a V-shaped region to perform shielding, the welding operation monitoring system comprising:
an image capturing device that is disposed on a side opposite to a side to which the plasma flow is supplied out of a pipe inside and a pipe outside of the strip-shaped steel sheet formed in a tubular shape, and is configured to capture a color image including the plasma flow over the V-shaped region; and
a welding operation monitoring device that is configured to generate a specific color component image obtained by extracting a specific color component from the color image, and specifies a V-shaped display region, which is a region corresponding to the V-shaped region within the color image, on the basis of the V-shaped region shown in the specific color component image, thereby analyzing a state of the welding operation.

2. The welding operation monitoring system according to claim 1,
wherein the welding operation monitoring device includes a blue component image extraction unit that is configured to generate a blue component image as the specific color component image.

3. The welding operation monitoring system according to claim 2,
wherein the welding operation monitoring device further includes
a plasma flow position analysis unit that is configured to extract a red component image or a green component image or a combination thereof from a portion of the V-shaped display region of the color image, and specify a plasma flow center region of the plasma flow from shading of the extracted red component image or the green component image or a combination thereof.

4. The welding operation monitoring system according to claim 3,
wherein the plasma flow position analysis unit includes
a plasma flow centerline calculation unit that is configured to linearly approximate a pair of plasma edges forming the plasma flow center region to find a V-shaped convergence angle and find a bisector between the pair of plasma edges as a plasma flow centerline.

5. The welding operation monitoring system according to claim 4,
wherein the welding operation monitoring device further includes
a physical abutment point analysis unit that is configured to detect a physical abutment point where the pair of abutment end portions physically abuts against each other on the basis of the blue component image.

6. The welding operation monitoring system according to claim 5,
wherein the plasma flow position analysis unit further includes
a comparing unit that is configured to find a relative positional relationship between a position of the plasma flow centerline and a position of the physical abutment point obtained from the physical abutment point analysis unit.

7. The welding operation monitoring system according to claim 2,
wherein the welding operation monitoring device further includes
a physical abutment point analysis unit that is configured to detect a physical abutment point where the pair of abutment end portions physically abuts against each other on the basis of the blue component image.

8. The welding operation monitoring system according to claim 2,
wherein the welding operation monitoring device further includes
a geometrically V-shaped convergence point analysis unit that is configured to find a pair of approximated straight lines obtained by linearly approximating the pair of abutment end portions forming the V-shaped display region and detect an intersection point between the pair of approximated straight lines as a geometrically V-shaped convergence point.

9. The welding operation monitoring system according to claim 2,
wherein the welding operation monitoring device further includes
a welding point analysis unit that is configured to eliminate an image of the plasma flow specified on the basis of the blue component image from the color image, thereby generating a plasma flow eliminated image including a welding bead line and a pair of melting edge lines and finding a welding point on the basis of the plasma flow eliminated image.

10. The welding operation monitoring system according to claim 1,
wherein the image capturing device includes an optical element that is configured to selectively reduce a luminance of a component corresponding to a specific wavelength in a red component of the plasma flow, and
wherein the welding operation monitoring device includes
a red component image extraction unit that is configured to extract a red component image as the specific color component image from the color image captured via the optical element by the image capturing device, and
a binarization processing unit that is configured to perform binarization processing on the red component image.

11. The welding operation monitoring system according to claim 10,
wherein the welding operation monitoring device further includes
a plasma flow position analysis unit that is configured to specify a plasma flow center region of the plasma flow on the basis of the binarized red component image.

12. The welding operation monitoring system according to claim 11,
wherein the plasma flow position analysis unit includes
a plasma flow centerline calculation unit that is configured to find a bisector between a pair of plasma edges as a plasma flow centerline on the basis of a V-shaped convergence angle obtained by linearly approximating the pair of plasma edges forming the plasma flow center region.

13. The welding operation monitoring system according to claim 12,
wherein the welding operation monitoring device further includes
a physical abutment point analysis unit that is configured to detect a physical abutment point where the pair of abutment end portions physically abuts against each other on the basis of the binarized red component image.

14. The welding operation monitoring system according to claim 13,
wherein the plasma flow position analysis unit further includes
a comparing unit that is configured to find a relative positional relationship between a position of the plasma flow centerline and a position of the physical abutment point obtained from the physical abutment point analysis unit.

15. The welding operation monitoring system according to claim 10,
wherein the welding operation monitoring device further includes
a physical abutment point analysis unit that is configured to find a physical abutment point where the pair of abutment end portions physically abuts against each other on the basis of the binarized red component image.

16. The welding operation monitoring system according to claim 10,
wherein the welding operation monitoring device further includes
a geometrically V-shaped convergence point analysis unit that is configured to find a pair of approximated straight lines obtained by linearly approximating a pair of melting edge lines on the basis of the binarized red component image and finds an intersection point between the pair of approximated straight line as a geometrically V-shaped convergence point.

17. The welding operation monitoring system according to claim 10,
wherein the welding operation monitoring device further includes
a welding point analysis unit that is configured to eliminate an image of the plasma flow specified on the basis of the binarized red component image from the color image, thereby generating a plasma flow eliminated image including a welding bead line and a pair of melting edge lines and finding a welding point on the basis of the plasma flow eliminated image.

18. A welding operation monitoring method that monitors a welding operation when a pair of abutment end portions is converged in a V-shape while a strip-shaped steel sheet is formed in a tubular shape and electric resistance welding is performed while supplying a plasma flow to a welded part including a V-shaped region to perform shielding, the welding operation monitoring method comprising:
an image capturing step of capturing a color image including the plasma flow over the V-shaped region, from a side opposite to a side to which the plasma flow is supplied out of a pipe inside and a pipe outside of the strip-shaped steel sheet formed in a tubular shape; and
a welding operation monitoring step of extracting a specific color component from the color image to generate a specific color component image, and specifying a V-shaped display region, which is a region corresponding to the V-shaped region within the color image, on the basis of the V-shaped region shown in the specific color component image, thereby analyzing a state of the welding operation.

19. The welding operation monitoring method according to claim 18,
wherein in the welding operation monitoring step,
a blue component image is generated as the specific color component image,
a red component image or a green component image or a combination thereof is extracted from the color image of a portion of the V-shaped region, and
a plasma flow center region of the plasma flow is specified from shading of the extracted red component image or the green component image or a combination thereof.

20. The welding operation monitoring method according to claim 18,
wherein in the image capturing step, the color image is acquired by selectively reducing a luminance of a component corresponding to a specific wavelength in a red component of the plasma flow to perform capturing, and
wherein in the welding operation monitoring step, a state of the welding operation is analyzed on the basis of the color image in which a luminance of the component corresponding to the specific wavelength is selectively reduced.

* * * * *